(12) United States Patent
Nagata et al.

(10) Patent No.: US 12,510,367 B2
(45) Date of Patent: Dec. 30, 2025

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Yu Nagata, Chofu (JP); Ai Miyata, Sakai (JP); Satoshi Komamine, Nagoya (JP); Syouta Komatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 18/446,577

(22) Filed: Aug. 9, 2023

(65) Prior Publication Data

US 2024/0068826 A1 Feb. 29, 2024

(30) Foreign Application Priority Data

Aug. 25, 2022 (JP) .................. 2022-134471

(51) Int. Cl.
G01C 21/34 (2006.01)
G08G 1/01 (2006.01)
G08G 1/052 (2006.01)
G06Q 50/26 (2012.01)

(52) U.S. Cl.
CPC ....... *G01C 21/3461* (2013.01); *G08G 1/0133* (2013.01); *G08G 1/052* (2013.01); *G06Q 50/265* (2013.01)

(58) Field of Classification Search
CPC .. G01C 21/3461; G08G 1/0133; G08G 1/052; G06Q 50/265
See application file for complete search history.

(56) References Cited

U.S. PATENT DOCUMENTS

| | | | |
|---|---|---|---|
| 2010/0030434 A1* | 2/2010 | Okabe | B60K 28/06 719/327 |
| 2014/0306813 A1* | 10/2014 | Tabe | B60Q 5/00 340/425.5 |
| 2015/0210287 A1* | 7/2015 | Penilla | B60N 2/0024 701/49 |
| 2015/0294430 A1* | 10/2015 | Huang | G08G 1/22 701/2 |
| 2018/0059913 A1* | 3/2018 | Penilla | H04W 12/068 |
| 2019/0068434 A1* | 2/2019 | Moreira da Mota | G08G 1/052 |
| 2019/0182640 A1 | 6/2019 | Kitagishi et al. | |
| 2019/0333373 A1* | 10/2019 | Fang | G08G 1/096775 |
| 2021/0248704 A1* | 8/2021 | Wang | G06Q 50/40 |
| 2021/0272458 A1* | 9/2021 | Civitella | G08G 1/123 |
| 2022/0291684 A1* | 9/2022 | Yoshimura | G01C 21/3423 |
| 2022/0379806 A1* | 12/2022 | Spoor | B60Q 1/0023 |
| 2023/0059772 A1* | 2/2023 | Bang | G05D 1/0011 |
| 2023/0160703 A1* | 5/2023 | Beaurepaire | G01C 21/3492 701/533 |

(Continued)

FOREIGN PATENT DOCUMENTS

JP 2019-106019 A 6/2019

*Primary Examiner* — Peter D Nolan
*Assistant Examiner* — Wae L Louie
(74) *Attorney, Agent, or Firm* — Oliff PLC

(57) ABSTRACT

The present information processing device includes a processor configured to determine, based on information indicating vehicle behavior about a plurality of vehicles, a boarding and alighting place of a transport vehicle that transports a user among places satisfying a predetermined condition concerning behavior of the plurality of vehicles.

16 Claims, 18 Drawing Sheets

(56) References Cited

U.S. PATENT DOCUMENTS

| | | | |
|---|---|---|---|
| 2024/0005437 A1* | 1/2024 | Kashiwakura | G06Q 50/40 |
| 2024/0019263 A1* | 1/2024 | Jikuhara | G08G 1/202 |
| 2024/0035835 A1* | 2/2024 | Nagata | G01C 21/3415 |
| 2024/0068826 A1* | 2/2024 | Nagata | G08G 1/0133 |

* cited by examiner

| AREA | TIME | ACCELERATION | TRAVELING SPEED | TRAVELLING DIRECTION |
|---|---|---|---|---|
| A01 | 07:07 | +10 | 60 | 120 |
| A02 | 11:52 | 0 | 40 | 32 |
| A03 | 12:39 | -7 | 25 | 95 |
| A01 | 12:41 | +17 | 55 | 121 |

| USER ID | BOARDING POINT | BOARDING DATE AND TIME | ALIGHTING POINT | NUMBER OF PEOPLE |
|---|---|---|---|---|
| U001 | S02 | 2022/02/14 10:00 | S08 | 1 |
| U002 | S03 | 2022/02/14 10:15 | S18 | 1 |
| U003 | S05 | 2022/02/14 10:25 | S18 | 1 |
| U004 | S11 | 2022/02/14 10:42 | S11 | 2 |

*FIG. 10* 312

| BUS ID | CURRENT LOCATION | ROUTE | STOP POINT | STOP DATE AND TIME | USER ID | AVAILABLE SEAT |
|---|---|---|---|---|---|---|
| V001 | × × × | × × × | S02 | 2022/02/14 10:00 | U001_ON | 3 |
| | | | S03 | 2022/02/14 10:15 | U002_ON | 2 |
| | | | S05 | 2022/02/14 10:25 | U003_ON | 1 |
| | | | S08 | 2022/02/14 10:37 | U001_OFF | 2 |
| | | | S11 | 2022/02/14 10:42 | U004_ON | 0 |
| | | | S18 | 2022/02/14 10:48 | U002_OFF U003_OFF U004_OFF | 4 |
| V002 | × × × | × × × | × × × | × × × | × × × | × × × |
| | | | × × × | × × × | × × × | × × × |
| | | | × × × | × × × | × × × | × × × |
| | | | × × × | × × × | × × × | × × × |
| V003 | × × × | × × × | × × × | × × × | × × × | × × × |
| ... | ... | ... | ... | ... | ... | ... |

| MOVING SIGN ID | CURRENT LOCATION | ROUTE | STOP POINT | STOP DATE AND TIME | BUS ID |
|---|---|---|---|---|---|
| BS001 | × × × | × × × | × × × | × × × | V001 |
| | | | × × × | × × × | V002 |
| | | | × × × | × × × | V003 |
| | | | × × × | × × × | V004 |
| | | | ... | ... | ... |
| BS002 | × × × | × × × | × × × | × × × | × × × |
| | | | × × × | × × × | × × × |
| | | | × × × | × × × | × × × |
| | | | × × × | × × × | × × × |
| BS003 | × × × | × × × | × × × | × × × | × × × |
| ... | ... | ... | ... | ... | ... |

| CAMERA ID | INSTALLATION PLACE |
|---|---|
| BS001 | ××× |
| BS002 | ××× |
| BS003 | ××× |
| ... | ... |

INFORMATION PROCESSING DEVICE AND INFORMATION PROCESSING METHOD

CROSS REFERENCE TO THE RELATED APPLICATION

This application claims the benefit of Japanese Patent Application No. 2022-134471, filed on Aug. 25, 2022, which is hereby incorporated by reference herein in its entirety.

BACKGROUND

Technical Field

The present disclosure relates to an information processing device and an information processing method.

Description of the Related Art

There has been proposed a technique for considering attribute information and moving distances of a plurality of users to set virtual bus stops in positions fairer from the viewpoint of the plurality of users (see, for example, Japanese Patent Application Laid-Open No. 2019-106019 (Patent Literature 1)).

Depending on a boarding and alighting place of a vehicle, there may be cases where safety of a user of the vehicle is not be maintained or where traffic of other vehicles is hindered. An object of the present disclosure is to determine, as a boarding and alighting place of a vehicle, a place which is safer and where traffic of other vehicles is not hindered as much as possible.

SUMMARY

An aspect of the present disclosure is an information processing device including
    a processor configured to determine, based on information indicating vehicle behavior about each of a plurality of vehicles, a boarding and alighting place of a transport vehicle that transports a user among places satisfying a predetermined condition concerning the vehicle behavior.

An aspect of the present disclosure is an information processing method executed by a computer, including
    determining, based on information indicating vehicle behavior about each of a plurality of vehicles, a boarding and alighting place of a transport vehicle that transports a user among places satisfying a predetermined condition concerning the vehicle behavior.

According to the present disclosure, it is possible to determine, as a boarding and alighting place of a vehicle, a place which is safer and where traffic of other vehicles is not hindered as much as possible.

BRIEF DESCRIPTION OF THE DRAWINGS

FIG. 8 is a diagram illustrating a table configuration of the vehicle behavior information DB;
FIG. 10 is a diagram illustrating a table configuration of the bus information DB;
FIG. 11 is a diagram illustrating a table configuration of the moving sign information DB;
FIG. 12 is a diagram illustrating a table configuration of the camera management DB.

DESCRIPTION OF THE EMBODIMENTS

An information processing device according to an aspect of the present disclosure includes a processor. Based on information indicating vehicle behavior about a plurality of vehicles, the processor determines a boarding and alighting place of a transport vehicle that transports a user among places satisfying a predetermined condition concerning the vehicle behavior.

Examples of the transport vehicle that transports the user can include an on-demand bus, a vehicle used by ride share, and a fixed-route bus. In the on-demand bus and the vehicle used by ride share, there is also a boarding and alighting place set according to a desire of the user other than a permanent boarding and alighting place. Since the boarding and alighting place is set according to the desire of the user, convenience of the on-demand bus and the vehicle used by ride share is improved.

However, depending on a boarding and alighting place, there may be cases where user safety is not be maintained and traffic of other vehicles is hindered to cause a traffic jam (or worsen the traffic jam). Examples of a place where user safety cannot be maintained may include a place where a large number of vehicles that perform sudden acceleration and sudden braking are present and a place where a large number of vehicles that suddenly change travelling directions (perform abrupt steering) are present. Examples of a place where traffic of other vehicles is hindered may include a place where a large number of vehicles traveling at low traveling speed (for example, "0 km/h") are present and a place where a large number of vehicles are traveling. Therefore, the present information processing device determines, using information indicating behavior of a plurality of vehicles collected in each of a plurality of places, a boarding and alighting place among places where the information satisfies a predetermined condition concerning the behavior of the plurality of vehicles. Therefore, with the present information processing device, it is possible to determine a safer place as a boarding and alighting place of the transport vehicle.

Embodiments of the present disclosure are explained below with reference to the drawings. Configurations of the embodiments explained below are illustrations. The present disclosure is not limited to the configurations of the embodiments. The embodiments explained below can be combined as much as possible.

First Embodiment

Figure 1:
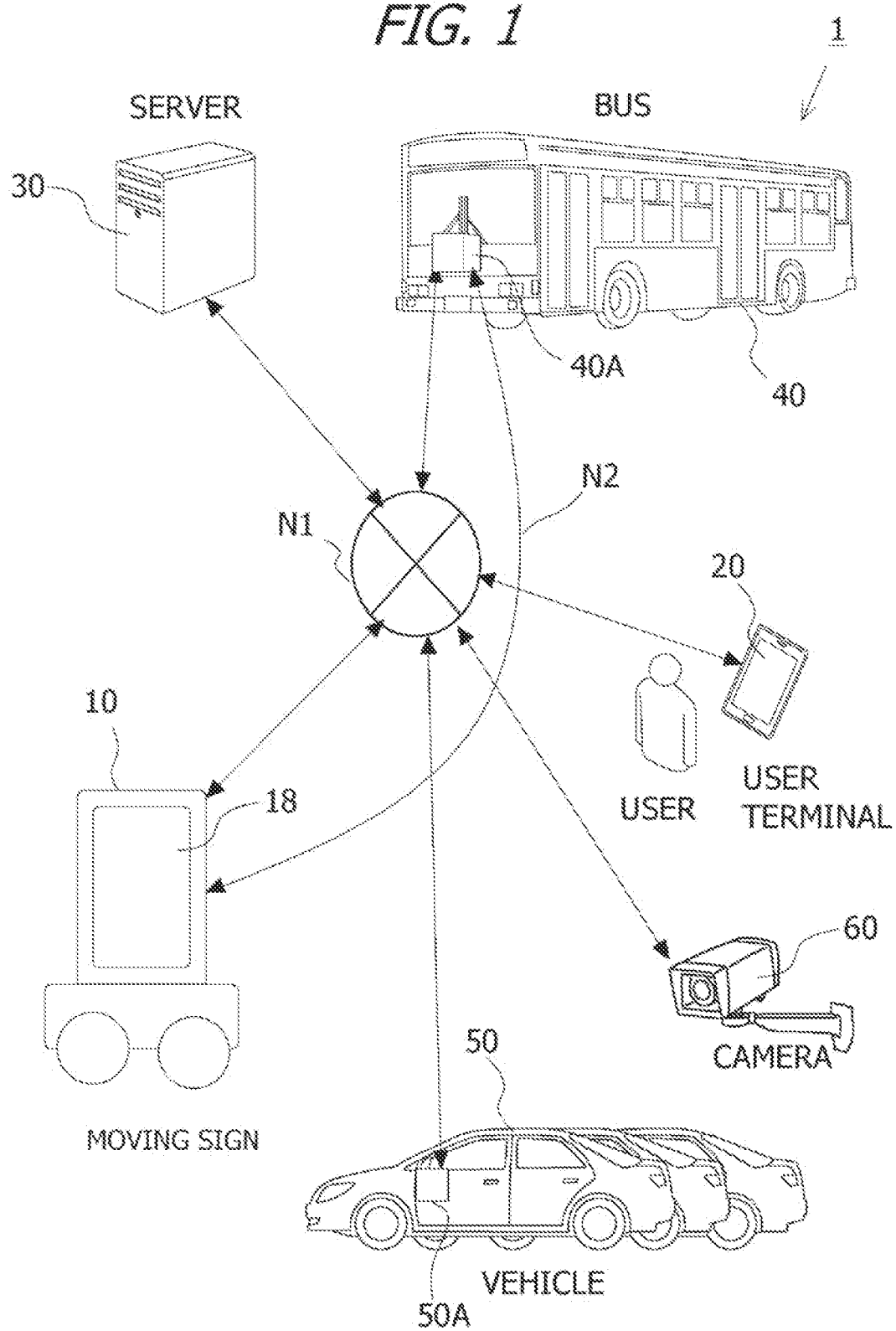
FIG. 1 is a diagram illustrating a schematic configuration of a system according to an embodiment.

FIG. 1 is a diagram illustrating a schematic configuration of a system 1 according to an embodiment. The system 1 is a system in which a server 30 collects information indicating vehicle behavior of a bus 40 and a vehicle 50, determines a stop point of the bus 40 based on the collected information, and dispatches a moving sign 10 to the stop point of the bus 40. Note that, in the following explanation, it is assumed that the stop point of the bus 40 indicates a boarding point that is a point where a user gets on the bus 40 or an alighting point that is a point where the user gets off the bus 40. The stop point of the bus is sometimes referred to as "bus stop" as well.

The user can reserve the bus 40 by transmitting a use request to the server 30 via a user terminal 20. The use request is information for the user to use the bus 40. The use request includes information concerning a boarding point that is a point where the user gets on the bus 40, a boarding date and time that is a date and time when the user gets on the bus 40, and an alighting point that is a point where the user gets off the bus 40. The user can transmit the use request to the server 30 by, for example, executing a predetermined application installed in the user terminal 20.

The bus 40 is a vehicle in on-demand traffic operated according to a reservation of the user. The bus 40 is, for example, a vehicle driven by a driver. However, as another method, the bus 40 may be an autonomously travelable vehicle. The bus 40 travels on a route including the boarding point and the alighting point of the user. For example, the server 30 determines positions of bus stops and the route of the bus 40. Note that the bus 40 is not limited to a large vehicle and may be a small passenger car. The bus 40 is an example of "a transport vehicle that transports a user according to a reservation".

In an on-demand bus, a permanent sign is sometimes absent in a bus stop and a user using the bus sometimes does not notice at a glance that a point used as the bus stop is the bus stop. Therefore, it is likely that the user using the bus does not see where to wait for the bus. Therefore, it is conceivable to dispatch a mobile display device. By using the display device, it is possible to display, at the point used as the bus stop, that the point is the bus stop. Therefore, the display device is caused to arrive earlier than arrival time of the bus, whereby the user can recognize the stop point of the bus.

The moving sign 10 has, for example, a configuration of an electric automobile and travels by actuating a motor with electric power stored in a battery. The moving sign 10 is capable of autonomously traveling. The moving sign 10 includes, for example, a display 18. The moving sign 10 can inform the user of the position of a bus stop by causing the display 18 to display a screen indicating that a point used as the bus stop is the bus stop. Note that the moving sign 10 is an example of a mobile display device. The server 30 generates, based on a stop point and stop time of the bus 40, a command for moving the moving sign 10. The server 30 manages the operation of the moving sign 10 such that, for example, the moving sign 10 arrives at, a predetermined time before time of day reserved by the user, a point where the user gets on the bus 40.

A camera 60 is a monitoring camera that photographs a road on which the bus 40 and the vehicle 50 travel. A video photographed by the camera 60 is transmitted to the server 30 via a network N1.

The server 30 is a device that manages the moving sign 10, the bus 40, and the camera 60. When receiving a use request for the bus 40 from the user terminal 20, the server 30 determines the moving sign 10 dispatched to the boarding point of the user and the bus 40, generates operation commands to the moving sign 10 and the bus 40, and transmits the operation commands to the moving sign 10 and the bus 40.

Here, depending on a place, it is conceivable that, if the place is set as a boarding point or an alighting point of the bus 40, there may be cases where safety of the user of the bus 40 cannot be secured or traffic of the other vehicles 50 and the like is hindered. Therefore, the server 30 collects vehicle behavior information indicating behavior of vehicles from the bus 40, the vehicle 50, and the camera 60 and determines, based on the collected vehicle behavior information, a point used as a bus stop of the bus 40 while avoiding a place where it is assumed difficult to secure user safety and a place where traffic is likely to be hindered.

The moving sign 10, the user terminal 20, the server 30, the bus 40, the vehicle 50, and the camera 60 are connected to one another by the network N1. As the network N1, for example, a WAN (Wide Area Network), which is a global-scale public communication network such as the Internet, or another communication network may be adopted. The network N1 may include a telephone communication network such as a cellular phone or a wireless communication network such as Wi-Fi®.

The moving sign 10 is connected to the bus 40, for example, via a network N2. The network N2 performs data communication using, for example, vehicle to vehicle (V2V) communication, Bluetooth® Low Energy, NFC (Near Field Communication), UWB (Ultra Wideband), or Wi-Fi®. Note that peripheral vehicles 50 may be connected to the network N1.

(Hardware Configuration)

Figure 2:
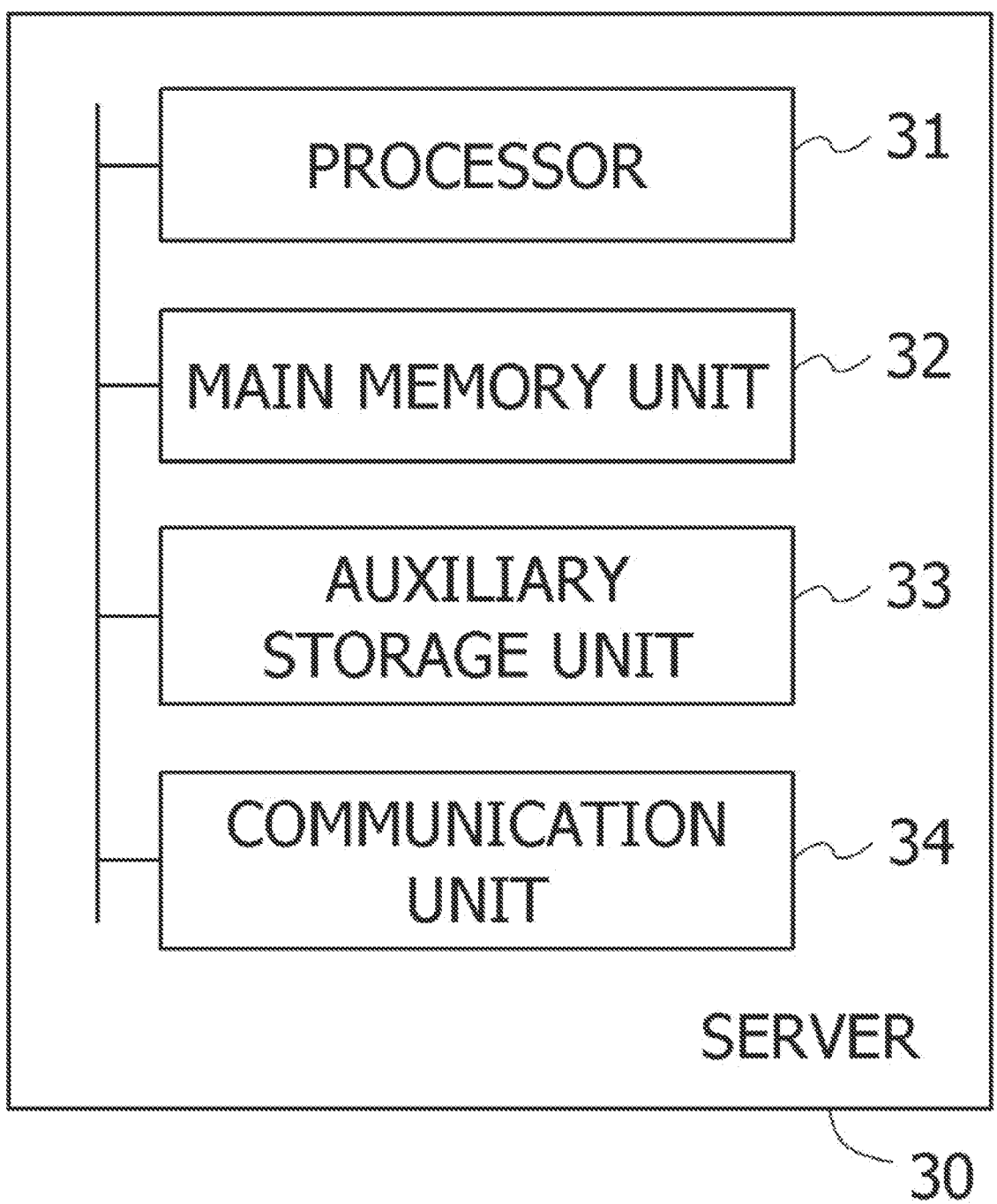
FIG. 2 is a diagram illustrating an example of a hardware configuration of the server.

FIG. 2 is a diagram illustrating an example of a hardware configuration of the server 30. The hardware configuration of the server 30 is explained with reference to FIG. 2.

The server 30 is an information processing device including a processor 31, a main memory unit 32, an auxiliary storage unit 33, and a communication unit 34. These are connected to one another by a bus. The processor 31 is an example of a processor.

The processor 31 is a CPU (Central Processing Unit), a DSP (Digital Signal Processor), or the like. The processor 31 controls the server 30 and performs arithmetic operations of various kinds of information processing. The main memory unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. An operating system (OS), various programs, various tables, and the like are stored in the auxiliary storage unit 33. The processor 31 loads a program stored in the auxiliary storage unit 33 to a work region of the main memory unit 32 and executes the program. The components and the like are controlled through the execution of the program. Consequently, the server 30 implements a function matching a predetermined purpose. The main memory unit 32 and the auxiliary storage unit 33 are computer-readable recording media. Note that the server 30 may be a single computer or may be a plurality of computers cooperating with one another. Information stored in the auxiliary storage unit 33 may be stored in the main memory unit 32. Information stored in the main memory unit 32 may be stored in the auxiliary storage unit 33.

The communication unit 34 is a device for communicating with the moving sign 10, the user terminal 20, the bus 40, and the camera 60 through the network N1. The communication unit 34 is, for example, a LAN (Local Area Network) interface board or a wireless communication circuit for wireless communication. The LAN interface board or the wireless communication circuit is connected to the network N1.

Figure 3:
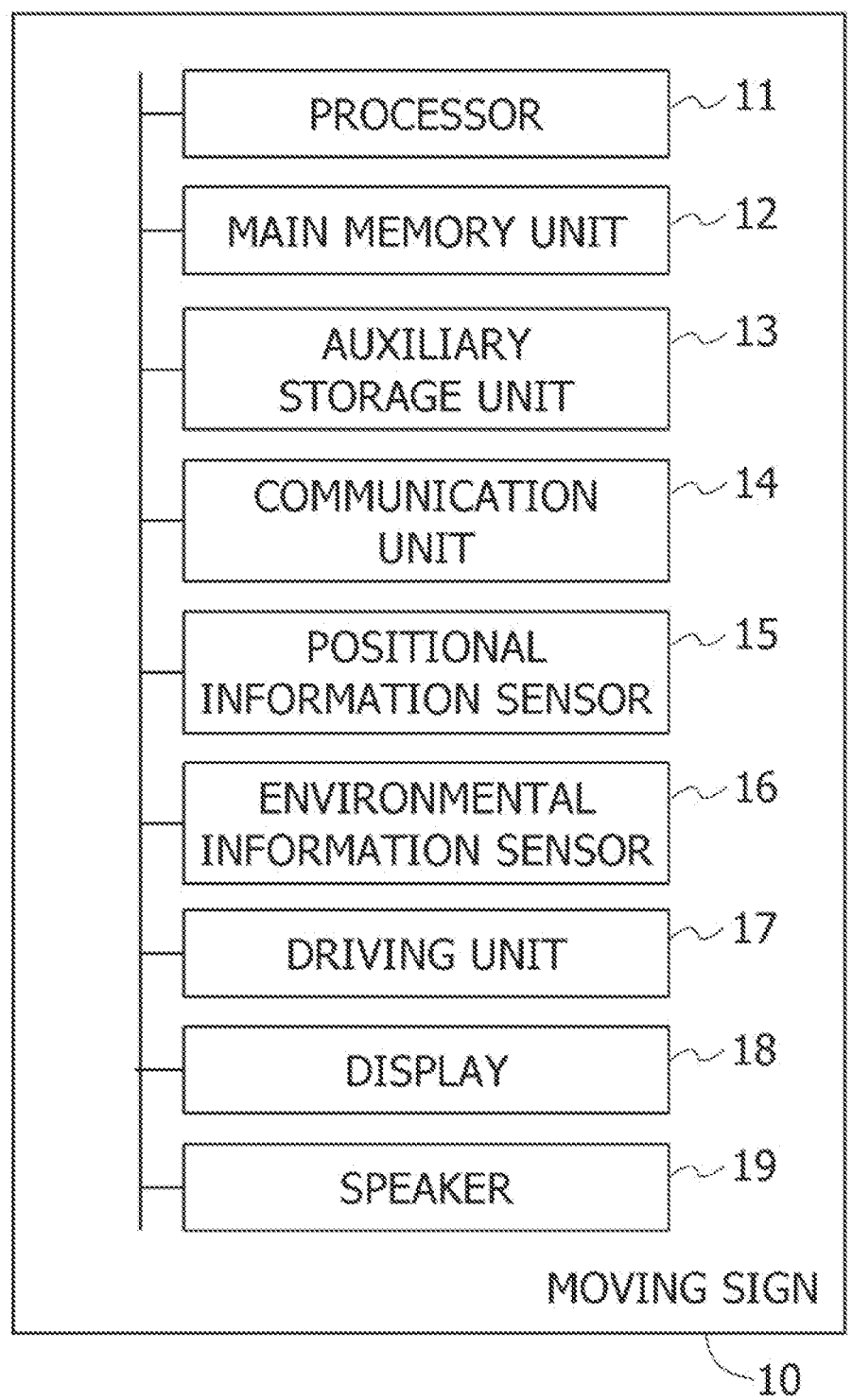
FIG. 3 is a diagram illustrating an example of a hardware configuration of the moving sign.

FIG. 3 is a diagram illustrating an example of a hardware configuration of the moving sign 10. The hardware configuration of the moving sign 10 is explained with reference to FIG. 3.

The moving sign 10 is, for example, a mobile body capable of autonomously traveling. The moving sign 10 is an information processing device including a processor 11, a main memory unit 12, an auxiliary storage unit 13, a communication unit 14, a positional information sensor 15, an environmental information sensor 16, a driving unit 17, a display 18, and a speaker 19. These are connected to one another by a bus. Since the processor 11, the main memory unit 12, and the auxiliary storage unit 13 are the same as the processor 31, the main memory unit 32, and the auxiliary storage unit 33 of the server 30, explanation thereof is omitted.

The communication unit 14 is a communication device for connecting the moving sign 10 to the network N1 or the network N2. The communication unit 14 is a circuit for communicating with the other devices (for example, the server 30, the bus 40, or the vehicle 50) through the network N1 or the network N2 using a wireless communication network such as a mobile communication service (a telephone communication network such as 5G (5th Generation), 4G (4th Generation), 3G (3rd Generation), or LTE (Long Term Evolution)), a vehicle to vehicle (V2V) communication network, Wi-Fi®, Bluetooth® Low Energy, NFC (Near Field Communication), or UWB (Ultra Wideband).

The positional information sensor 15 acquires positional information (for example, latitude and longitude) of the moving sign 10 at a predetermined period. The positional information sensor 15 is, for example, a GPS (Global Positioning System), a receiving unit, or a wireless communication unit. The information acquired by the positional information sensor 15 is recorded in, for example, the auxiliary storage unit 13 and transmitted to the server 30.

The environmental information sensor 16 is a device for sensing a state of the moving sign 10 or sensing the periphery of the moving sign 10. Examples of a sensor for sensing a state of the moving sign 10 include a gyro sensor, a speed sensor, an acceleration sensor, or an azimuth sensor. Examples of a sensor for sensing the periphery of the moving sign 10 include a stereo camera, a laser scanner, an LIDAR, or a radar.

The driving unit 17 is a device for causing, based on a control command generated by the processor 11, the moving sign 10 to travel. The driving unit 17 includes, for example, a plurality of motors for driving wheels included in the moving sign 10. The plurality of motors operates according to the control command, whereby autonomous traveling of the moving sign 10 is implemented.

The display 18 is a device for presenting information to the user and includes, for example, an LCD (Liquid Crystal Display) or an EL (Electroluminescence) panel. The speaker 19 is a device for outputting voice, warning sound, or the like.

Figure 4:
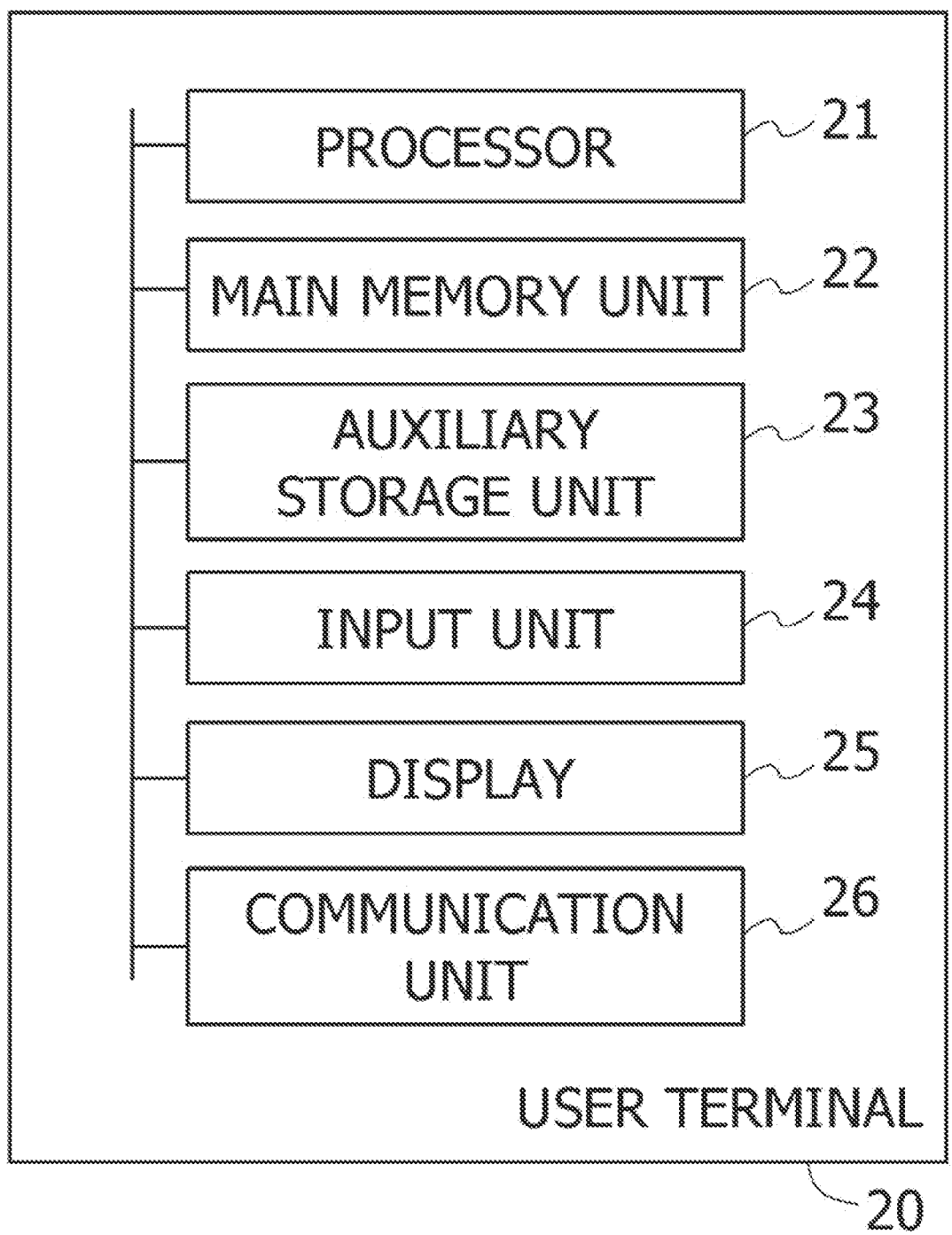
FIG. 4 is a diagram illustrating an example of a hardware configuration of the user terminal.

FIG. 4 is a diagram illustrating an example of a hardware configuration of the user terminal 20. The hardware configuration of the user terminal 20 is explained with reference to FIG. 4.

The user terminal 20 is a small information processing device such as a smartphone, a cellular phone, a tablet terminal, a personal information terminal, a wearable computer (a smartwatch or the like), or a personal computer (PC). The user terminal 20 includes a processor 21, a main memory unit 22, an auxiliary storage unit 23, an input unit 24, a display 25, and a communication unit 26. These are connected to one another by a bus. Since the processor 21, the main memory unit 22, and the auxiliary storage unit 23 are the same as the processor 31, the main memory unit 32, and the auxiliary storage unit 33 of the server 30, explanation thereof is omitted.

The input unit 24 is a device for receiving input operation performed by the user and is, for example, a touch panel, a mouse, a keyboard, or a push button. The display 25 is a device for presenting information to the user and is, for example, an LCD (Liquid Crystal Display) or an EL (Electroluminescence) panel. The input unit 24 and the display 25 may be implemented as one touch panel display.

The communication unit 26 is a communication device for connecting to the network N1 and is a circuit for communicating with the other devices (for example, the server 30) through the network N1 using a wireless communication network such as a mobile communication service (a telephone communication network such as 5G (5th Generation), 4G (4th Generation), 3G (3rd Generation), or LTE (Long Term Evolution)), Wi-Fi®, Bluetooth® Low Energy, NFC (Near Field Communication), or UWB (Ultra Wideband).

Figure 5:
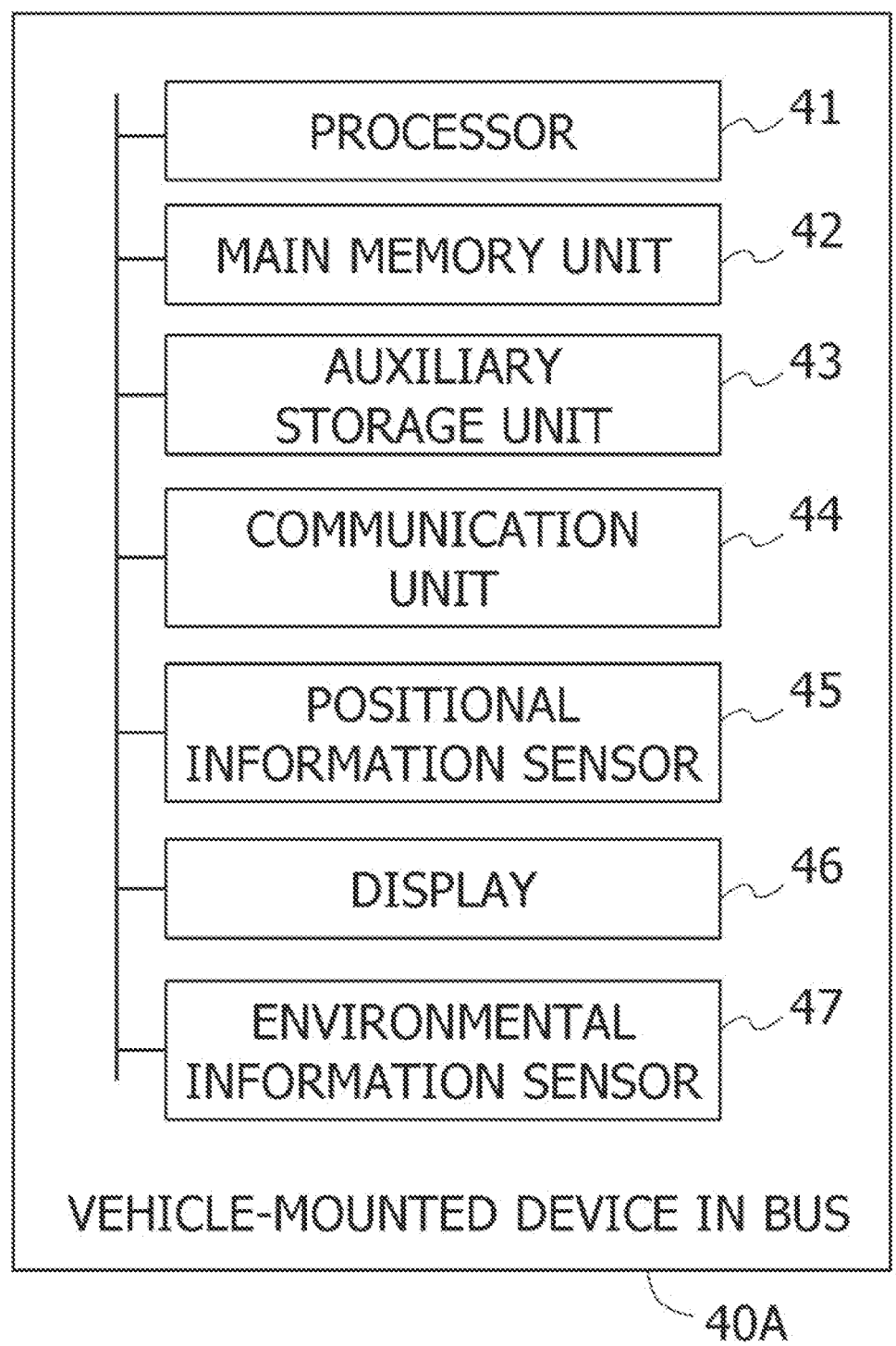
FIG. 5 is a diagram illustrating an example of a hardware configuration of a vehicle-mounted device included in the bus.

FIG. 5 is a diagram illustrating an example of a hardware configuration of a vehicle-mounted device 40A included in the bus 40. The hardware configuration of the vehicle-mounted device 40A is explained with reference to FIG. 5.

The vehicle-mounted device 40A of the bus 40 is an information processing device including a processor 41, a main memory unit 42, an auxiliary storage unit 43, a communication unit 44, a positional information sensor 45, a display 46, and an environmental information sensor 47. These are connected to one another by a bus. Since the processor 41, the main memory unit 42, and the auxiliary storage unit 43 are the same as the processor 31, the main memory unit 32, and the auxiliary storage unit 33 of the server 30, explanation thereof is omitted. Since the communication unit 44 and the positional information sensor 45 are the same as the communication unit 14 and the positional information sensor 15 of the moving sign 10, explanation thereof is omitted. Since the display 46 is the same as the display 25 of the user terminal 20, explanation thereof is omitted. Since the environmental information sensor 47 is the same as the environmental information sensor 16 of the moving sign 10, explanation thereof is omitted. Note that the bus 40 may be, for example, a mobile body capable of autonomously traveling. In this case, as in the moving sign 10, the processor 41 controls the bus 40 based on a command from the server 30.

Figure 6:
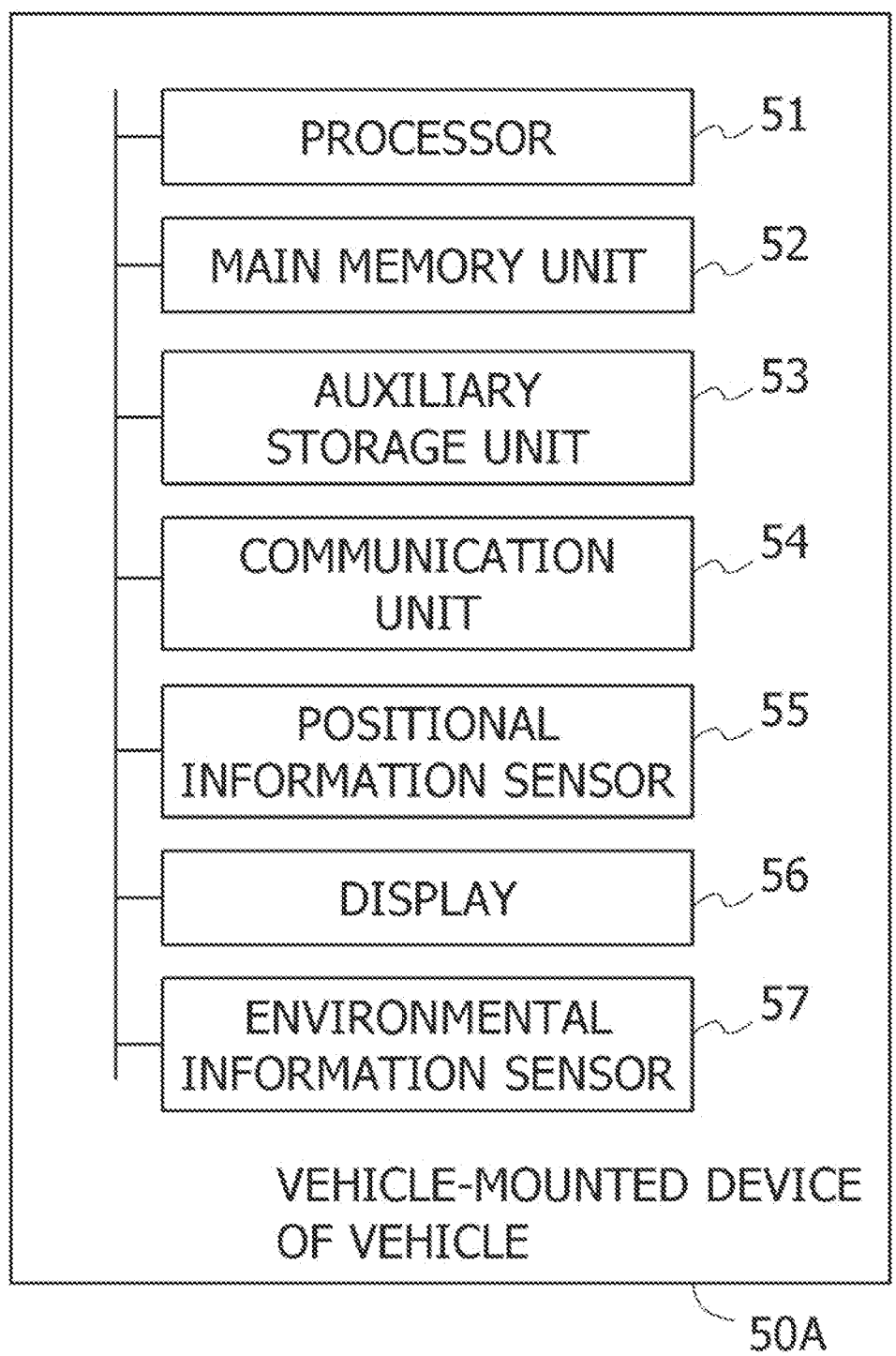
FIG. 6 is a diagram illustrating an example of a hardware configuration of a vehicle-mounted device included in the vehicle.

FIG. 6 is a diagram illustrating an example of a hardware configuration of a vehicle-mounted device 50A included in the vehicle 50. The hardware configuration of the vehicle-mounted device 50A is explained with reference to FIG. 6.

The vehicle-mounted device 50A of the vehicle 50 is an information processing device including a processor 51, a main memory unit 52, an auxiliary storage unit 53, a communication unit 54, a positional information sensor 55, a display 56, and an environmental information sensor 57. These are connected to one another by a bus. Since the processor 51, the main memory unit 52, and the auxiliary storage unit 53 are the same as the processor 31, the main memory unit 32, and the auxiliary storage unit 33 of the server 30, explanation thereof is omitted. Since the communication unit 54 and the positional information sensor 55 are the same as the communication unit 14 and the positional information sensor 15 of the moving sign 10, explanation thereof is omitted. Since the display 56 is the same as the display 25 of the user terminal 20, explanation thereof is omitted. Since the environmental information sensor 57 is the same as the environmental information sensor 16 of the moving sign 10, explanation thereof is omitted.

(Functional Configuration)

Figure 7:
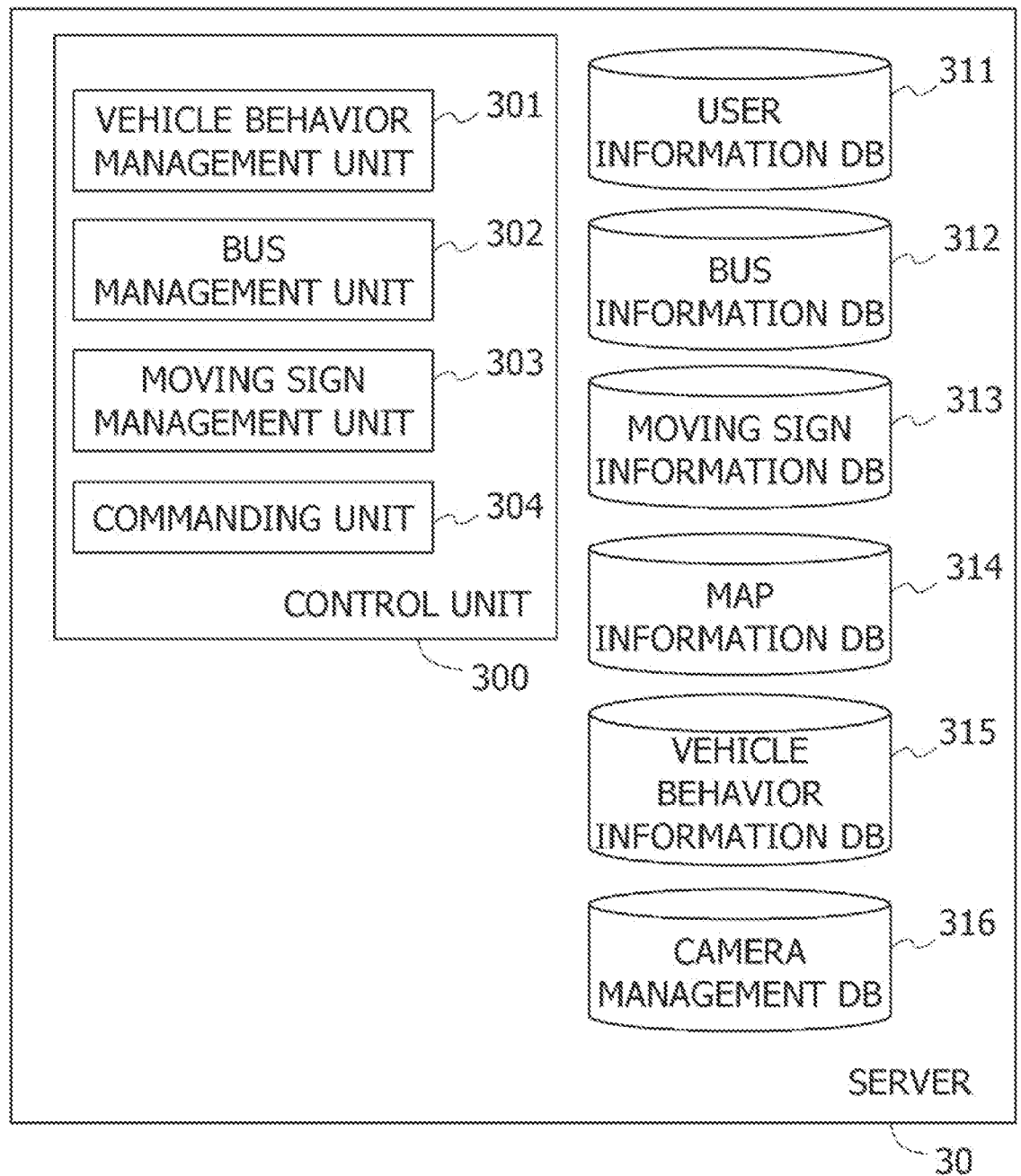
FIG. 7 is a diagram illustrating a functional configuration of the server.

FIG. 7 is a diagram illustrating a functional configuration of the server 30. The server 30 includes, as functional components, a control unit 300, a user information DB 311, a bus information DB 312, a moving sign information DB 313, a map information DB 314, a vehicle behavior information DB 315, and a camera management DB 316. The processor 31 of the server 30 executes processing of the control unit 300 according to a computer program on the main memory unit 32. However, any one of the functional components or a part of processing of the functional components may be executed by a hardware circuit. The control unit 300 includes a vehicle behavior management unit 301, a bus management unit 302, a moving sign management unit 303, and a commanding unit 304.

The user information DB 311, the bus information DB 312, the moving sign information DB 313, the map information DB 314, and the vehicle behavior information DB 315 are constructed by a program of a database management system (DBMS) executed by the processor 31 managing data stored in the auxiliary storage unit 33. The user information DB 311, the bus information DB 312, the moving sign information DB 313, the map information DB 314, and the vehicle behavior information DB 315 are, for example, relational databases.

Note that any one of the functional components of the server 30 or a part of processing of the functional components may be executed by another computer connected to the network N1.

The vehicle behavior management unit 301 collects vehicle behavior information indicating behavior of the bus 40 and the vehicle 50 from the vehicle-mounted device 40A of the bus 40, the vehicle-mounted device 50A of the vehicle 50, and the camera 60 and updates the vehicle behavior information DB 315 explained below. Specifically, the vehicle behavior management unit 301 periodically communicates with a plurality of busses 40, a plurality of vehicles 50, and a plurality of cameras 60 and collects vehicle behavior information indicating behavior of the bus 40 and the vehicle 50. Examples of the vehicle behavior information can include information indicating positions, information indicating times, information indicating accelerations, information indicating traveling speeds, and information indicating travelling directions of the bus 40 and the vehicle 50. Note that, for example, the information indicating accelerations may be set to a positive value during acceleration and set to a negative value during deceleration. Examples of the information indicating travelling directions can include an azimuth and north, south, east and west.

The information indicating the position of the bus 40 can be acquired from, for example, the positional information sensor 45 of the vehicle-mounted device 40A. The information indicating the position of the vehicle 50 can be acquired from, for example, the positional information sensor 55 of the vehicle-mounted device 50A. The positions of the bus 40 and the vehicle 50 can also be acquired from, for example, a video photographed by the camera 60. Since a position where the camera 60 is installed is managed by the camera management DB 316 explained below, the positions of the bus 40 and the vehicle 50 can also be acquired based on the video of the camera 60.

The information indicating the acceleration of the bus 40 can be acquired from, for example, an acceleration sensor included in the environmental information sensor 47 of the vehicle-mounted device 40A. The information indicating the acceleration of the vehicle 50 can be acquired from, for example, an acceleration sensor included in the environmental information sensor 57 of the vehicle-mounted device 50A. The information indicating the accelerations of the bus 40 and the vehicle 50 can also be acquired from, for example, a video photographed by the camera 60.

The information indicating the traveling speed of the bus 40 can be acquired from, for example, a speed sensor included in the environmental information sensor 47 of the vehicle-mounted device 40A. The information indicating the traveling speed of the vehicle 50 can be acquired from, for example, a speed sensor included in the environmental information sensor 57 of the vehicle-mounted device 50A. The information indicating the traveling speeds of the bus 40 and the vehicle 50 can also be acquired from, for example, a video photographed by the camera 60.

The information indicating the travelling direction of the bus 40 can be acquired from, for example, an azimuth sensor included in the environmental information sensor 47 of the vehicle-mounted device 40A. The information indicating the travelling direction of the vehicle 50 can be acquired from, for example, an azimuth sensor included in the environmental information sensor 57 of the vehicle-mounted device 50A. The information indicating the speeds of the bus 40 and the vehicle 50 can also be acquired from, for example, a video photographed by the camera 60.

FIG. 8 is a diagram illustrating a table configuration of the vehicle behavior information DB 315. The vehicle behavior information DB 315 includes fields of an area, a time, acceleration, traveling speed, and a travelling direction. In the area field, information indicating a representative point indicating a predetermined region is stored. The area is, for example, a region within a predetermined range centering on the representative point. Examples of the information indicating the representative point can include a coordinate (latitude and longitude), an address, a name of a building, or a name or a number of a bus stop. In the area field, for example, information indicating a representative point of the area is stored in advance. In the time field, information indicating a time is stored. The information indicating the time indicates, for example, time of day when vehicle behavior information is received from the vehicle-mounted device 40A of the bus 40 or the vehicle-mounted device 50A of the vehicle 50. The information indicating the time may indicate, for example, time of day when vehicle behavior information is transmitted by the vehicle-mounted device 40A of the bus 40 or the vehicle-mounted device 50A of the vehicle 50. For example, the information indicating the time may be represented by a date and time or may be represented solely by a time. The information indicating the time may be represented by, for example, information indicating a time period. The information indicating the time may include, for example, information indicating weekdays and holidays. In the acceleration field, a value indicating acceleration in a predetermined unit time collected from the bus 40 or the vehicle 50 traveling in an area corresponding to the acceleration field is stored. In the traveling speed field, a value of traveling speed collected from the bus 40 or the vehicle 50 traveling in an area corresponding to the traveling speed field is stored. In the travelling direction field, information indicating a travelling direction collected from the bus 40 or the vehicle 50 traveling in an area corresponding to the travelling direction field is stored. In the vehicle behavior information DB 315, one record (a set of the area, the acceleration, the traveling speed, and the travelling direction) indicates vehicle behavior information relating to one bus 40 or one vehicle 50. The number of busses 40 or vehicles 50 that traveled in the same area in the same time can be grasped according to the number of records corresponding to a combination of the same area and the same time, the records being extracted from the vehicle behavior information DB 315.

The bus management unit 302 collects information concerning the bus 40 and updates the bus information DB 312 explained below. Specifically, the bus management unit 302 periodically communicates with a plurality of busses 40 and collects information concerning a current position of the bus 40. The collected information is reflected on the bus information DB 312 explained below.

The bus management unit 302 acquires a use request sent from a user desiring to use the bus. The use request is information transmitted from the user terminal 20 to the server 30. The use request includes information concerning a user ID, a boarding point, a boarding date and time, an alighting point, and the like. Further, the use request may include information concerning the number of people who use the bus 40. The user ID is an identifier specific to the user. User information (for example, a name, an address, a telephone number, and an e-mail address) corresponding to the user ID may be registered by the user in advance using the user terminal 20 or may be transmitted from the user terminal 20 together with the use request. The user information is stored in the auxiliary storage unit 33 while being linked with the user ID. The information concerning the boarding point, the boarding date and time, the alighting point, and the like included in the use request is stored in the user information DB 311.

Figure 9:
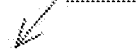
FIG. 9 is a diagram illustrating a table configuration of the user information DB.

Here, FIG. 9 is a diagram illustrating a table configuration of the user information DB 311. The user information DB 311 includes fields of a user ID, a boarding point, a boarding date and time, an alighting point, and the number of people. Information (a user ID) with which the user is identifiable is input to the user ID field. In the boarding point field, the information concerning the boarding point included in the use request is stored. The boarding point is a point where the user desires to get on the bus 40 and is indicated by, for example, a coordinate (latitude and longitude), an address, a name of a building, or a name or a number of a bus stop.

In the boarding date and time field, the information concerning the boarding date and time included in the use request is stored. The boarding date and time is a date and time when the user desires to get on the bus 40. Note that the boarding date and time may be designated as a time period having a certain degree of width. In the alighting point field, the information concerning the alighting point included in the use request is stored. The alighting point is a point where the user desires to get off the bus 40 and is indicated by, for example, a coordinate (latitude and longitude), an address, a name of a building, or a name or a number of a bus stop. In the number of people field, the information concerning the number of people included in the use request is stored. The number of people is the number of people who desire to get on the bus 40.

When receiving the use request from the user terminal 20, the commanding unit 304 selects a dispatchable bus 40 based on the information such as the boarding point, the boarding date and time, and the alighting point included in the use request. The dispatchable bus 40 is the bus 40 having available seats for the number of people, capable of moving to the boarding point at the boarding date and time, and capable of moving to the alighting point thereafter. For example, the bus 40 reserved for boarding or alighting at the different point at the same date and time does not correspond to the bus 40 capable of moving to the boarding point at the boarding date and time. Therefore, the bus 40 may be selected according to a route of the bus 40 at a current point in time.

Here, the commanding unit 304 refers to the vehicle behavior information DB 315, excludes areas where safety of the user of the bus 40 cannot be secured and traffic of the other vehicles 50 and the like is hindered, and determines a boarding point and an alighting point of the bus 40. Examples of the area where safety of the user of the bus 40 cannot be secured may include an area where sudden acceleration and sudden braking frequently occur, an area where the number of traveling vehicles is large, and an area where visibility is poor because of a sharp curve, an obstacle, or the like. Examples of the area where traffic of the other vehicles 50 and the like is hindered to cause a traffic jam or worsen the traffic jam may include an area where there are a large number of vehicles (more than a predetermined number of vehicles), traveling speed of which is "0".

Examples of the area where sudden acceleration and sudden braking frequently occur may include an area where there are a large number of vehicles (more than a predetermined number of vehicles), acceleration of which stored in the acceleration field is larger than a predetermined absolute value. Examples of the area where the number of traveling vehicles is large may include an area where the number of records associated with the same area is larger than a predetermined threshold. Examples of the area where visibility is poor because of a sharp curve, an obstacle, or the like may include an area where fluctuation in a travelling direction among a plurality of vehicles is large (outside a predetermined range).

The commanding unit 304 extracts bus stop candidate points referring to the map information DB 314 and determines, as a bus stop, a bus stop candidate point belonging to an area not excluded and close to the boarding point and the alighting point included in the use request among the extracted bus stop candidate points. For example, when extracting, from the vehicle behavior information DB 315, a plurality of areas for the same boarding point or alighting point, the commanding unit 304 may preferentially determine, as a bus stop, an area where the number of traveling vehicles is small.

After selecting the dispatchable bus 40, the commanding unit 304 generates an operation command, which is a command for causing the bus 40 to operate. The operation command includes, for example, a route of the bus 40. The commanding unit 304 generates a route based on map information stored in the map information DB 314. The commanding unit 304 generates the operation command such that, for example, the bus 40 starts from a current location and travels to pass bus stops at boarding dates and times.

Note that, in the map information DB 314, as the map information, for example, link data concerning roads (links), node data concerning node points, intersection data concerning intersections, search data for searching for a route, facility data concerning a facility such as an entrance of a store, data concerning bus stop candidate points, search data for searching for a point, and the like are stored. In the map information DB 314, data indicating a range of an area is stored.

After generating the operation command for the bus 40, the commanding unit 304 updates the bus information DB 312. Here, a configuration of bus information stored in the bus information DB 312 is explained with reference to FIG. 10. FIG. 10 is a diagram illustrating a table configuration of the bus information DB 312. A bus information table includes fields of a bus ID, a current location, a route, a stop point, a stop date and time, a user ID, and an available seat. Information (a bus ID) with which the bus 40 is identifiable is input to the bus ID field. Bus IDs are given to the busses 40 by, for example, the bus management unit 302. Information (positional information) concerning a current location of the bus 40 is input to the current location field. The current location of the bus 40 is detected by the positional information sensor 45 of the bus 40 and transmitted to the server 30. The current location field is updated every time positional information is received from the bus 40.

Information concerning a route of the bus 40 is input to the route field. Information concerning a point where the bus 40 stops is input to the stop point field. Information concerning a point that can be a destination of the bus 40 such as a coordinate, an address, or a name of a building is input to the stop point field. The point where the bus 40 stops is a point where the user gets on or gets off the bus 40. Information concerning the position of the bus stop determined by the commanding unit 304 is stored. Note that stop point columns are arrayed in stopping order of the bus 40. Information concerning a stop date and time of the bus 40 corresponding to the stop point is input to the stop date and time field. Note that a date and time when the user gets off the bus 40 at the alighting point may be calculated based on the boarding time and a time for the bus 40 to move from the boarding point to the alighting point. Since the time for the bus 40 to move can be calculated from data, moving distances, and the like in the past, a date and time when the bus 40 arrives at the alighting point may be calculated based on the time.

Identification information (a user ID) specific to the user is input to the user ID field. A character string corresponding to boarding or alighting is added after the user ID. When the user gets on the bus 40 at a stop point corresponding thereto, a character string ON is added after the user ID. When the user gets off the bus 40 at a stop point corresponding thereto, a character string OFF is added after the user ID. In the available seat field, the number of available seats of the bus 40 at the time when the bus 40 starts from a stop point corresponding thereto is stored.

After selecting the bus 40 corresponding to the boarding point and the alighting point of the user, the commanding unit 304 further selects the moving sign 10 corresponding to the determined bus stops. Note that different moving signs 10 may be selected for the bus stop set as the boarding point and the bus stop set as the alighting point or the same moving sign 10 may be selected. For example, one moving sign 10 may be allocated for one bus 40. In this case, the moving sign 10 may move on the same route as a route of the bus 40 ahead of the bus 40. However, the commanding unit 304 causes the moving sign 10 to arrive at the bus stops a predetermined time earlier than the bus 40. Therefore, the commanding unit 304 generates an operation command for the moving sign 10 such that the moving sign 10 arrives at the stop point of the bus 40 a predetermined time before time of day when the bus 40 arrives at the stop point. The operation command includes a route, stop positions, arrival times at the stop positions, and departure times from the stop positions. The generated operation command is transmitted to the relevant moving sign 10.

One moving sign 10 may correspond to a plurality of busses 40. In this case, the moving sign 10 may correspond to a part of stop points of one bus 40 rather than corresponding to all the stop points of the one bus 40. For example, the commanding unit 304 may allocate one or a plurality of moving signs 10 to a predetermined region and cause the one or the plurality of moving signs 10 to operate to correspond to the bus 40 that stops in the predetermined region. In this case, the commanding unit 304 selects the moving sign 10 that can arrive at the stop position of the bus 40 a predetermined time before the bus 40 arrives at the stop position in the predetermined region and generates an operation command including a route of the moving sign 10. The generated operation command is transmitted to the relevant moving sign 10.

After generating the operation command for the moving sign 10, the commanding unit 304 updates the moving sign information DB 313. Here, a configuration of moving sign information stored in the moving sign information DB 313 is explained with reference to FIG. 11. FIG. 11 is a diagram illustrating a table configuration of the moving sign information DB 313. A moving sign information table includes fields of a moving sign ID, a current location, a route, a stop point, a stop date and time, and a bus ID. Information (a moving sign ID) with which the moving sign 10 is identifiable is input to the moving sign ID field. Moving sign IDs are given to the moving signs 10 by, for example, the moving sign management unit 303. Information (positional information) concerning a current location of the moving sign 10 is input to the current location field. The current location of the moving sign 10 is detected in every predetermined time by the positional information sensor 15 of the moving sign 10 and transmitted to the server 30.

Information concerning a route of the moving sign 10 is input to the route field. Information concerning a point where the moving sign 10 stops is input to the stop point field. Information concerning a point that can be a destination of the moving sign 10 such as a coordinate, an address, or a name of a building is input to the stop point field. The point where the moving sign 10 stops is a point where the user gets on or gets off the bus 40 and is the same as a stop point of the bus 40 corresponding to the point. Note that stop point columns are arrayed in stopping order of the moving sign 10. Information concerning a stop date and time of the moving sign 10 corresponding to the stop point is input to the stop date and time field. Note that information concerning a date and time when the bus 40 starts from a bus stop may also be input. A bus ID corresponding to the stop point is input to the bus ID field.

When the moving sign 10 arrives at the stop position of the bus 40, the commanding unit 304 may generate a command to inform, in the stop position of the bus 40, people around the moving sign 10 that the bus 40 stops thereafter and transmit the command to the moving sign 10. The commanding unit 304 may generate a command for causing, for example, the display 18 of the moving sign 10 to output information indicating the stop position of the bus 40.

Subsequently, a configuration of camera management information stored in the camera management DB 316 is explained with reference to FIG. 12. FIG. 12 is a diagram illustrating a table configuration of the camera management DB 316. A camera management information table includes fields of a camera ID and an installation place. Information (a camera ID) with which the camera 60 is identifiable is input to the camera ID field. Information (positional information) concerning a place where the camera 60 is installed is input to the installation place field. The camera management DB 316 is created, for example, when the system 1 is constructed.

Figure 13:
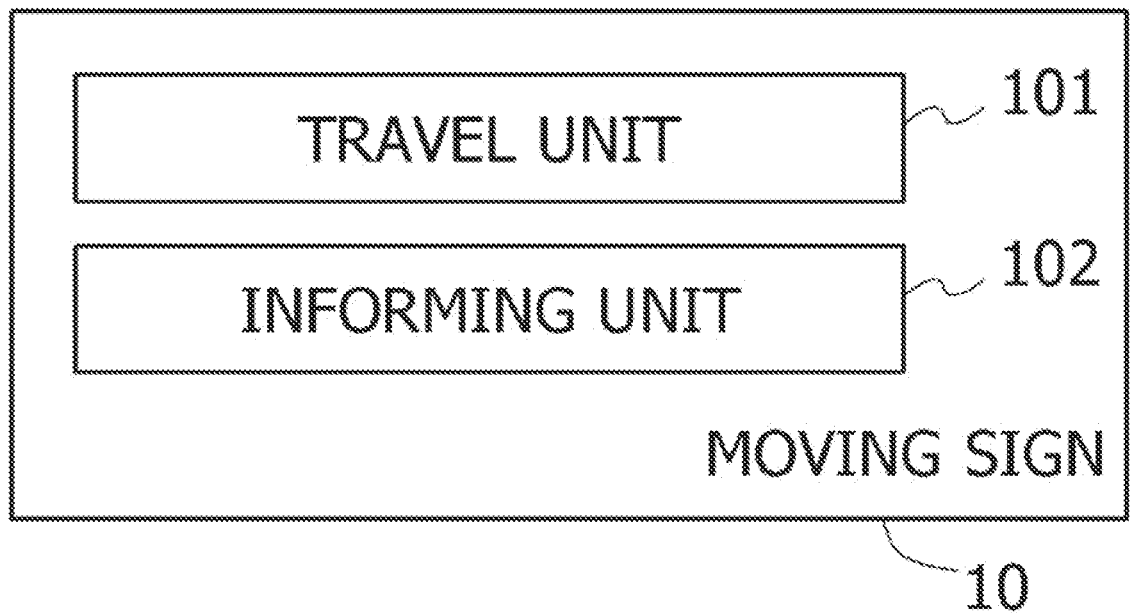
FIG. 13 is a diagram illustrating a functional configuration of the moving sign.

Subsequently, functions of the moving sign 10 are explained. FIG. 13 is a diagram illustrating a functional configuration of the moving sign 10. The moving sign 10 includes a travel unit 101 and an informing unit 102 as functional components. The processor 11 of the moving sign 10 executes processing of the travel unit 101 and the informing unit 102 according to a computer program on the main memory unit 12. However, any one of the functional components or a part of processing of the functional components may be executed by a hardware circuit. Note that any one of the functional components of the moving sign 10 or a part of the processing of the functional components may be executed by another computer connected to the network N1.

The travel unit 101 controls traveling of the moving sign 10 during autonomous traveling of the moving sign 10. The travel unit 101 generates, using data detected by the environmental information sensor 16, a control command for controlling the driving unit 17. For example, the travel unit 101 controls rotating speed of a plurality of motors to control the speed of the moving sign 10 or control a steering angle.

For example, the travel unit 101 generates a traveling track of the moving sign 10 based on data detected by the environmental information sensor 16 and controls the driving unit 17 such that the moving sign 10 travels along the traveling track. Note that, as a method for causing the moving sign 10 to autonomously travel, a publicly-known method can be adopted. The travel unit 101 may carry out feedback control based on a detection value of the environmental information sensor 16 during the autonomous traveling. The travel unit 101 causes the moving sign 10 to autonomously travel to move around a predetermined route. The route is included in the operation command transmitted from the server 30. For example, the travel unit 101 causes the moving sign 10 to travel based on the traveling route and the stop position included in the operation command received from the server 30. Note that, for example, the travel unit 101 causes the auxiliary storage unit 13 to store the operation command received from the server 30.

The travel unit 101 periodically transmits information concerning the moving sign 10 to the server 30. The travel unit 101 transmits, for example, information concerning a current location acquired by the positional information sensor 15, residual power of a battery, and the like to the server 30 as the information concerning the moving sign 10.

The informing unit 102 executes, at the stop point of the bus 40, informing processing that is processing for informing, for example, the stop point of the bus 40 to people or the vehicles 50 around the bus 40. The informing unit 102 executes the informing processing when both of a condition concerning the position of the moving sign 10 and a condition concerning time of day are satisfied. The informing unit 102 compares positional information detected by the positional information sensor 15 and the stop point included in the operation command transmitted from the server 30 and, when the current location of the moving sign 10 is within a predetermine region from the stop point of the bus 40, determines that the condition concerning the position is satisfied. Further, the informing unit 102 compares current time of day and time of day when the bus 40 stops at the stop point received from the server 30 and, when the current time of day is within a predetermined time before the time of day when the bus 40 stops at the stop point, determines that the condition concerning the time of day is satisfied. When determining that both of the conditions of the time of day and the position are satisfied, the informing unit 102 informs, for example, from the display 18 and the speaker 19, the point where the bus 40 stops.

Figure 14:
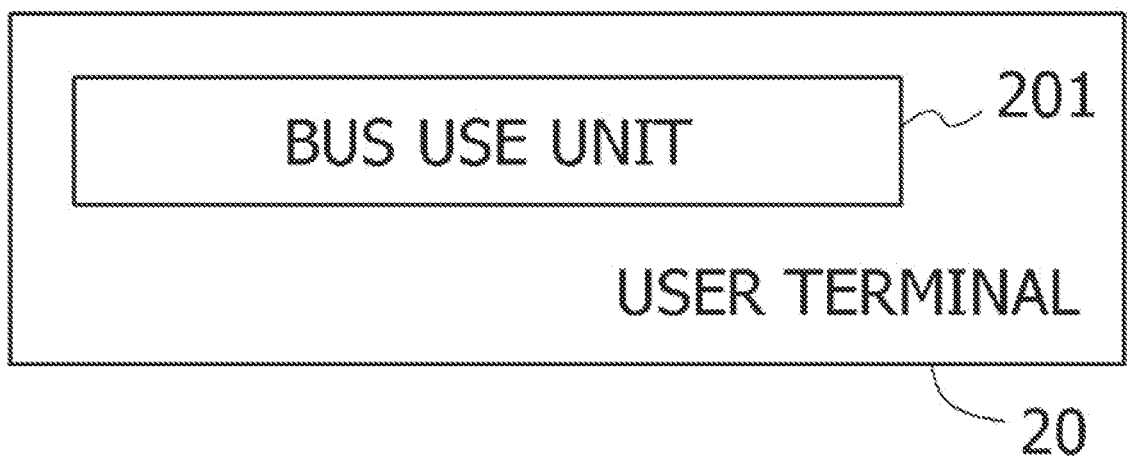
FIG. 14 is a diagram illustrating a functional configuration of the user terminal.

Subsequently, a function of the user terminal 20 is explained. FIG. 14 is a diagram illustrating a functional configuration of the user terminal 20. The user terminal 20 includes a bus use unit 201 as a functional component. The processor 21 of the user terminal 20 executes processing of the bus use unit 201 according to a computer program on the main memory unit 22. However, a part of the processing of the bus use unit 201 may be executed by a hardware circuit. Note that a part of the processing of the bus use unit 201 may be executed by another computer connected to the network N1.

The bus use unit 201 has a function of accessing the server 30 and performing interaction with the server 30. The function may be implemented by a Web browser operating in the user terminal 20 or dedicated application software. Note that, in the first embodiment, the bus use unit 201 is capable of executing application software for performing a dialog with the server 30. The bus use unit 201 generates a use request according to input to the input unit 24 of the user terminal 20.

For example, the bus use unit 201 requests input of a boarding point desired by the user (hereinafter referred to as desired boarding point as well), a boarding date and time desired by the user (hereinafter referred to as desired boarding date and time as well), an alighting point desired by the user (hereinafter referred to as desired alighting point as well), and the number of people. At this time, a current position of the user terminal 20 may be set as the desired boarding point and a current date and time may be set as the desired boarding date and time. The bus use unit 201 generates a use request including the user ID, the desired boarding point, the desired boarding date and time, the desired alighting point, and the number of people and transmits the use request to the server 30. The desired boarding point and the desired alighting point are examples of "boarding-and-off desired place".

(Processing Flow)

Figure 15:
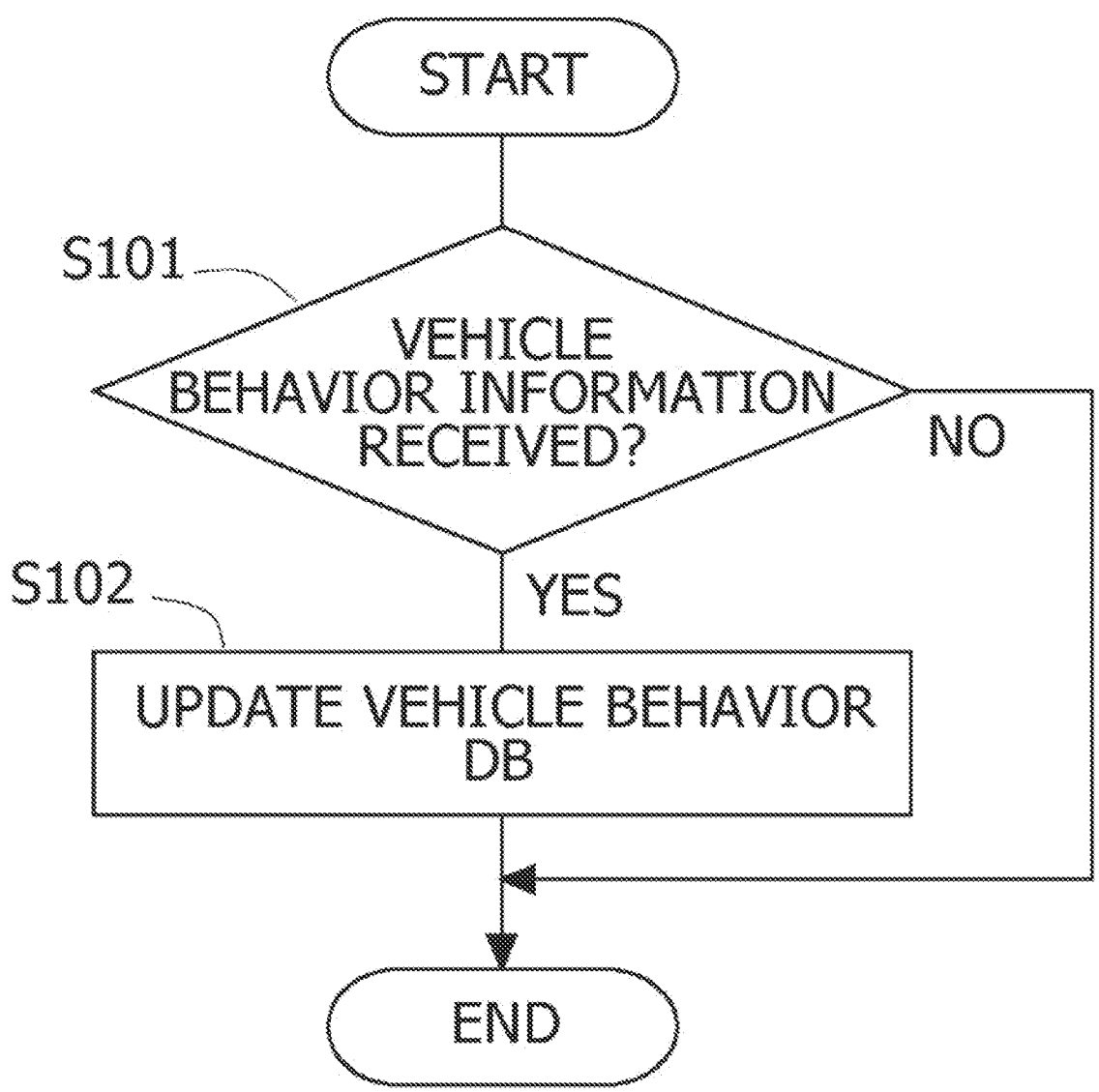
FIG. 15 is a flowchart of processing for collecting vehicle behavior information in the server according to this embodiment.

Subsequently, processing for generating operation commands for the moving sign 10 and the bus 40 in the server 30 is explained. FIG. 15 is a flowchart of processing for collecting vehicle behavior information in the server 30 according to this embodiment. The processing illustrated in FIG. 15 is executed in every predetermined time in the server 30.

In step S101, the vehicle behavior management unit 301 determines whether vehicle behavior information has been received from any one of the bus 40, the vehicle 50, and the camera 60. When the vehicle behavior information has been received (YES in step S101), the processing is advanced to step S102. When the vehicle behavior information has not been received (NO in step S101), the processing is ended.

In step S102, the vehicle behavior management unit 301 updates the vehicle behavior information DB 315 based on the vehicle behavior information received in step S101. For example, when the vehicle behavior information has been received from the vehicle-mounted device 40A of the bus 40, the vehicle behavior management unit 301 adds acceleration, traveling speed, and a travelling direction of the bus 40 notified from the vehicle-mounted device 40A to the vehicle behavior information DB 315 as a record of an area including a current position of the bus 40 notified from the vehicle-mounted device 40A. For example, when the vehicle behavior information is received from the vehicle-mounted device 50A of the vehicle 50, the vehicle behavior management unit 301 adds acceleration, traveling speed, and a travelling direction of the vehicle 50 notified from the vehicle-mounted device 50A to the vehicle behavior information DB 315 as a record of an area including a current position of the vehicle 50 notified from the vehicle-mounted device 50A. Note that the vehicle behavior management unit 301 specifies the areas including the current positions referring to the map information DB 314.

When a video has been received from the camera 60, the vehicle behavior management unit 301 acquires accelerations, traveling speeds, and travelling directions of the bus 40 and the vehicle 50 based on the video. The vehicle behavior management unit 301 refers to the camera management DB 316 based on a camera ID of the camera 60 that photographed the video and specifies an installation place of the camera 60 that photographed the video. The vehicle behavior management unit 301 adds the accelerations, the traveling speeds, and the travelling directions of the bus 40 and the vehicle 50 acquired from the video to the vehicle behavior information DB 315 as a record of an area including the specified installation place. Note that the vehicle behavior management unit 301 may specify the area including the installation place referring to the map information DB 314.

Figure 16:
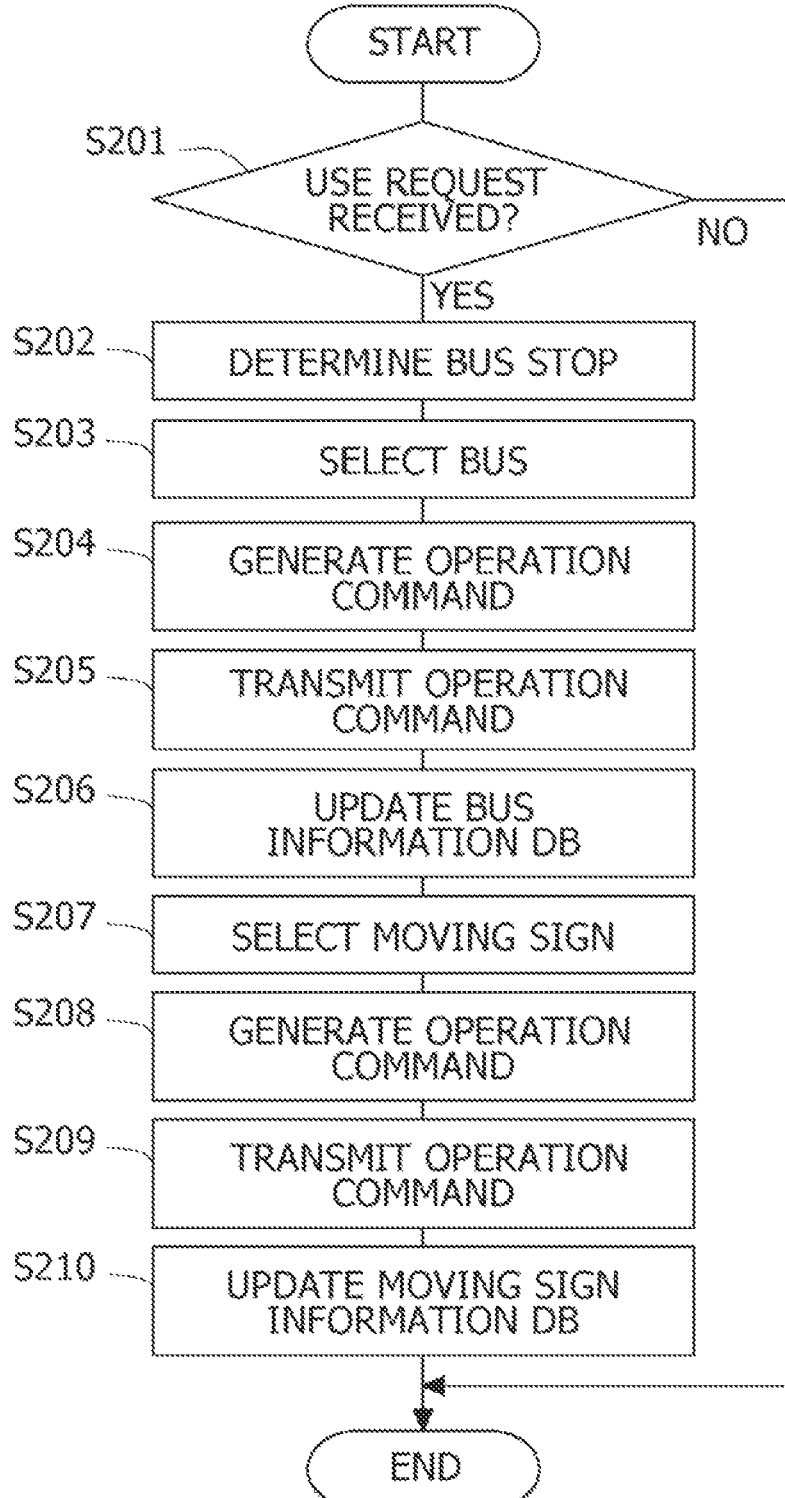
FIG. 16 is a flowchart of processing for generating operation commands for the moving sign and the bus in the server according to this embodiment.

FIG. 16 is a flowchart of processing for generating operation commands for the moving sign 10 and the bus 40 in the server 30 according to this embodiment. The processing illustrated in FIG. 16 is executed in every predetermined time in the server 30.

In step S201, the bus management unit 302 determines whether a use request has been received from the user terminal 20. When it is affirmatively determined in step S201, the processing proceeds to S202. When it is negatively determined in step S201, this routine ends.

In step S202, the commanding unit 304 determines a bus stop. The commanding unit 304 determines, based on a desired boarding point and a desired alighting point included in the use request received in step S201 and information stored in the vehicle behavior information DB 315, as a bus stop of the bus 40, a point where user safety can be secured as much as possible and traffic of the other vehicles 50 and the like is not hindered.

In step S203, the bus management unit 302 selects the bus 40 that takes in the user. The bus management unit 302 selects the bus 40 based on information included in the use request and bus information stored in the bus information DB 312.

In step S204, the commanding unit 304 generates an operation command such that the bus 40 starts from a current location and travels to pass through a boarding point at boarding dates and times and an alighting point. In this way, the commanding unit 304 sets bus stops based on information concerning a boarding point and an alighting point received from the user terminal 20. At this time, the commanding unit 304 may generate a route of the bus 40 and include the route of the bus 40 in the operation command.

In step S205, the commanding unit 304 transmits the operation command generated in step S204 to the bus 40. Further, in step S206, the commanding unit 304 updates the bus information DB 312. The commanding unit 304 inputs a new route to the route field of the bus 40 corresponding thereto and updates the fields of the stop point, the stop date and time, the user ID, and the available seat. At this time, as requested, the commanding unit 304 may change a record such that stop points are arranged in stop order in the route of the bus 40.

In step S207, the commanding unit 304 selects the moving sign 10 to be dispatched to the stop points of the bus 40. The commanding unit 304 selects the moving sign 10 based on, for example, the bus information stored in the bus information DB 312. Specifically, the commanding unit 304 selects the moving sign 10 capable of moving to a boarding point or an alighting point added anew. Note that, when one moving sign 10 is allocated to each of the busses 40, the moving sign 10 already allocated may be selected.

In step S208, the commanding unit 304 generates an operation command such that the moving sign 10 starts from a current location, arrives at the stop point a predetermined time before the stop date and time of the bus 40, and executes informing processing. A route of the moving sign 10 is included in the operation command.

In step S209, the commanding unit 304 transmits the operation command to the moving sign 10. Further, in step S210, the commanding unit 304 updates the moving sign information DB 313. That is, the commanding unit 304 inputs a new route to the route field of the moving sign 10 corresponding thereto and updates the stop point, the stop date and time, and the bus ID. At this time, as requested, the commanding unit 304 changes a record such that the stop points are arranged in stop order in the route of the moving sign 10.

Figure 17:
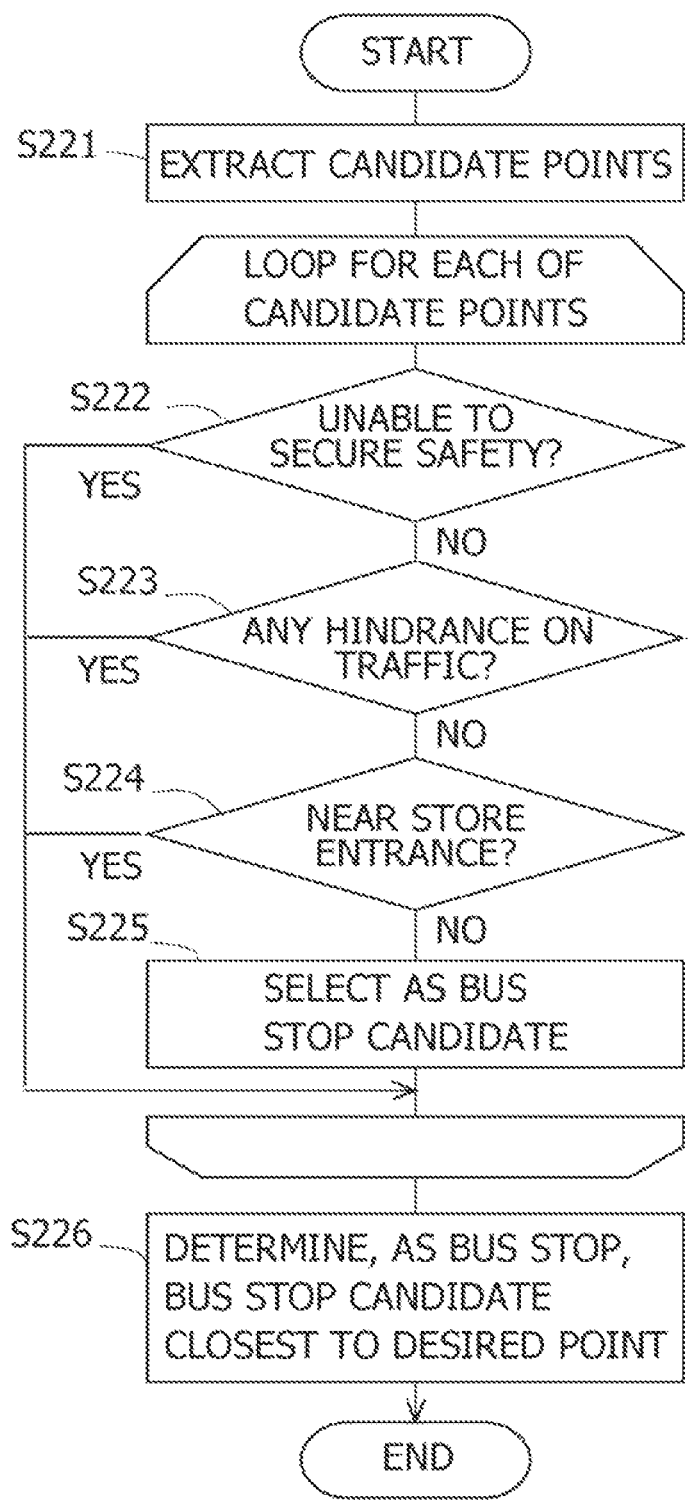
FIG. 17 is a flowchart of processing for determining a bus stop in the server according to this embodiment.

Here, more detailed processing for determining a bus stop is explained. FIG. 17 is a flowchart of processing for determining a bus stop in the server 30 according to this embodiment. The processing illustrated in FIG. 17 is executed, for example, in step S202 in FIG. 16.

In step S221, the commanding unit 304 extracts candidate points. The commanding unit 304 extracts, referring to the map information DB 314, candidate points of bus stops present within a predetermined range from the desired boarding point and the desired alighting point included in the use request received in step S201 in FIG. 16.

Processing in step S222 to step S225 is repeatedly executed for each of the candidate points extracted in step S221. In step S222, the commanding unit 304 determines whether the extracted candidate point belongs to an area where user safety cannot be secured. The commanding unit 304 refers to, for example, the vehicle behavior information DB 315 and determines whether the extracted candidate point belongs to an area where sudden acceleration and sudden braking frequently occur, an area where the number of traveling vehicles is larger than an allowed number of vehicles, and an area where visibility is poor because of a sharp curve, an obstacle, or the like. Here, the commanding unit 304 may extract, from the vehicle behavior information DB 315, a record corresponding to the desired boarding date and time and the alighting desired date and time included in the use request and determine whether the candidate point belongs to the area where sudden acceleration and sudden braking frequently occur, the area where the number of traveling vehicles is larger than an allowed number of vehicles, and the area where visibility is poor because of a sharp curve, an obstacle, or the like. When it is determined that the candidate point belongs to the area where safety cannot be secured (YES in step S222), the next loop (processing of the next candidate point) is started. When it is determined that the candidate point does not belong to the area where safety cannot be secured (NO in step S222), the processing is advanced to step S223.

In step S223, the commanding unit 304 determines whether the extracted candidate point belongs to an area where traffic is hindered. The commanding unit 304 refers to, for example, the vehicle behavior information DB 315 and determines whether the extracted candidate point belongs to an area where there are a large number of vehicles, traveling speed of which is "0". When it is determined that the extracted candidate point belongs to the area where traffic is hindered (YES in step S223), the next loop (processing of the next candidate point) is started. When it is determined that the extracted candidate point does not belong to the area where traffic is hindered (NO in step S223), the processing is advanced to step S224.

In step S224, the commanding unit 304 determines whether the extracted candidate point is near an entrance of a store. The commanding unit 304 refers to, for example, the map information DB 314 and determines whether the extracted candidate point is within a predetermined range from the entrance of the store. When the extracted candidate point is within the predetermined range from the entrance of the store (YES in step S224), the next loop (processing of the next candidate point) is started. When the extracted candidate point is outside the predetermined range from the entrance of the store (NO in step S224), the processing is advanced to step S225.

In step S225, the commanding unit 304 selects, as bus stop candidates, the candidate points narrowed down by the processing in step S222 to step S224.

In step S226, the commanding unit 304 determines, as a bus stop where the user gets on the bus 40, a bus stop candidate closest to the desired boarding point among the bus stop candidates selected in step S225. The commanding unit 304 determines, as a bus stop where the user gets off the bus 40, a bus stop candidate closest to the desired alighting point among the bus stop candidates selected in step S225.

Figure 18:
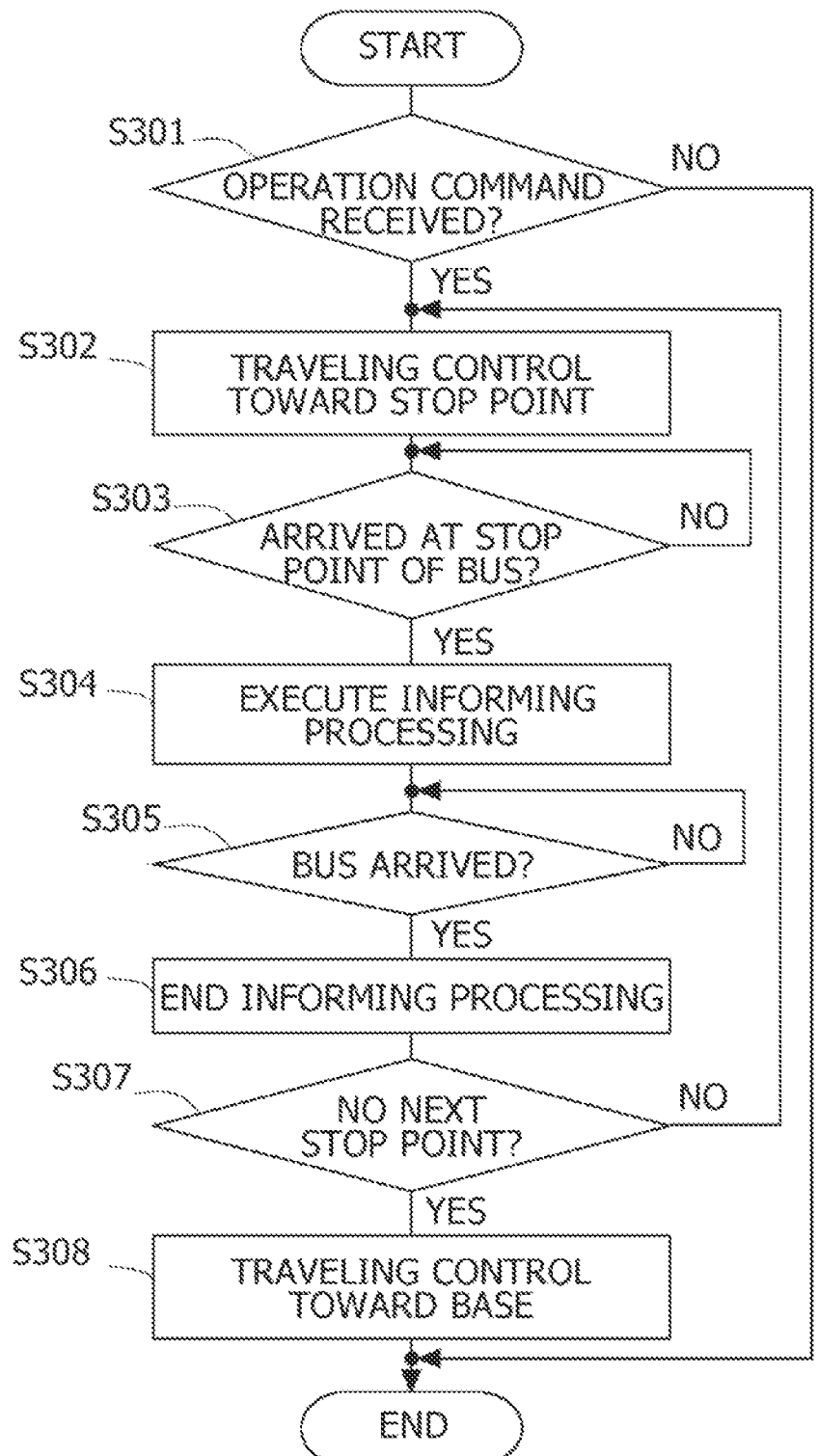
FIG. 18 is a flowchart of processing during an operation of the moving sign according to this embodiment.

Subsequently, processing in the moving sign 10 is explained. FIG. 18 is a flowchart of processing during an operation of the moving sign 10 according to this embodiment. The processing illustrated in FIG. 18 is executed in every predetermined time in the moving sign 10.

In step S301, the travel unit 101 determines whether an operation command has been received. When it is affirmatively determined in step S301, the processing proceeds to step S302. When it is negatively determined in step S301, this routine ends.

In step S302, the travel unit 101 executes traveling control toward a stop point of the bus 40. The travel unit 101 specifies, based on, for example, a current position of the moving sign 10 and a route included in the operation command, a stop point of the bus 40 that is the next waypoint and controls the driving unit 17 to move to this stop point. The travel unit 101 controls the driving unit 17 to reach stop points a predetermined time before stop dates and times of the bus 40. Note that a publicly-known technique can be used for autonomous traveling by the travel unit 101.

In step S303, the travel unit 101 determines whether the moving sign 10 has arrived at the stop point of the buds 40. For example, the travel unit 101 compares positional information acquired by the positional information sensor 15 and information concerning the stop point of the bus 40 included in the operation command acquired from the server 30 and determines whether the moving sign 10 has arrived at the stop point. If it is affirmatively determined in step S303, the processing proceeds to step S304. When it is negatively determined in step S303, the processing in step S303 is executed again.

In step S304, the informing unit 102 executes informing processing. In step S305, the informing unit 102 determines whether the bus 40 has arrived. For example, the informing unit 102 may determine, by communicating with the bus 40 via the network N2, whether the bus 40 has arrived. When it is affirmatively determined in step S305, the processing proceeds to step S306. When it is negatively determined in step S305, the processing in step S305 is executed again.

In step S306, the informing unit 102 ends the informing processing. For example, the informing unit 102 extinguishes a screen displayed on the display 18 or stops sound output from the speaker 19 to end the informing.

In step S307, the travel unit 101 determines whether the next stop point is absent on the route. That is, the travel unit 101 determines whether the bus 40 has passed through all the stop points. If it is affirmatively determined in step S307, the processing proceeds to step S308. If it is negatively determined in step S307, the processing returns to step S302 and the travel unit 101 starts to the next stop point.

In step S308, the travel unit 101 executes traveling control toward a base. The base is a place where the moving sign 10 is stored and maintained and is a place where charging and the like of the moving sign 10 are performed.

As explained above, in the first embodiment, the vehicle behavior information of the bus 40 and the vehicle 50 is collected from the vehicle-mounted device 40A of the bus 40, the vehicle-mounted device 50A of the vehicle 50, and the camera 60. Based on the collected vehicle behavior information, a place where user safety can be secured as much as possible and traffic of the other vehicles 50 and the like is not hindered as much as possible is set as a bus stop where the bus 40 stops. Therefore, according to the first embodiment, the position of the bus stop of the bus 40 can be set in a place where user safety can be secured as much as possible and traffic of the other vehicles 50 and the like is not hindered as much as possible.

For example, the server 30 acquires accelerations of the bus 40 and the vehicle 50 as the vehicle behavior information. In an area where the absolute value of the acceleration is large, sudden acceleration and sudden braking of the bus 40 and the vehicle 50 are considered to have occurred. If a bus stop is set in such an area, safety of the user of the bus 40 is considered to be unable to be secured. In the first embodiment, a bus stop of the bus 40 is set excluding an area where the number of vehicles, acceleration of which stored in the acceleration field is larger than the predetermined absolute value, is equal to or larger than the predetermined threshold. Therefore, according to the first embodiment, an area where user safety can be further secured can be set as a bus stop of the bus 40.

For example, the server 30 acquires travelling directions of the bus 40 and the vehicle 50 as the vehicle behavior information. On a straight road, travelling directions of vehicles traveling in the same area are considered to be substantially the same (within a predetermined range). However, when an obstacle is present on a road or the road is a sharp curve, it is considered that the bus 40 and the vehicle 50 approaching the obstacle or the sharp curve greatly change travelling directions and, on the other hand, the bus 40 and the vehicle 50 at a predetermined distance or more to the obstacle or the sharp curve do not greatly change travelling directions. In the first embodiment, a bus stop of the bus 40 is set excluding an area where fluctuation in a travelling direction in a plurality of vehicles is outside a predetermined range. Therefore, according to the first embodiment, it is possible to set a bus stop of the bus 40 while avoiding, as much as possible, an area where visibility is poor because of a sharp curve, an obstacle, or the like.

The server 30 acquires traveling speeds of the bus 40 and the vehicle 50 as the vehicle behavior information. A traffic jam is considered to have occurred in an area where the number of vehicles, traveling speed of which is equal to or smaller than a predetermined threshold (for example, "0"), is more than a predetermined number of vehicles. This is considered to be because the jam is further worsened if a bus stop of the bus 40 is set in the area where the traffic jam has occurred. In the first embodiment, a bus stop of the bus 40 is set excluding the area where the number of vehicles, traveling speed of which is equal to or smaller than the predetermined threshold (for example, "0"), is more than the predetermined number of vehicles. Therefore, according to the first embodiment, it is possible to set a bus stop of the vehicle 40 while avoiding, as much as possible, a place where traffic is likely to be hindered.

The server 30 can acquire the number of passing vehicles in the areas by, for example, referring to the vehicle behavior information DB 315. If a bus stop of the bus 40 is set in an area where the number of vehicles is large, traffic of the vehicles 50 and the like is likely to be hindered. In the first embodiment, a bus stop of the bus 40 is set excluding an area where the number of vehicles passing the area is equal to or larger than the predetermined threshold. Therefore, according to the first embodiment, it is possible to set a bus stop of the bus 40 while avoiding, as much as possible, a place where traffic is likely to be hindered.

The server 30 determines, as a bus stop where the user gets on the bus 40, a bus stop candidate closest to the desired boarding point among the bus stop candidates selected in step S225 in FIG. 17 and determines, as a bus stop where the user gets off the bus 40, a bus stop candidate closest to the desired alighting point among the bus stop candidates. Therefore, according to the first embodiment, it is possible to determine, as a bus stop, a place where not only the viewpoint of user safety and smooth traffic of the other vehicles 50 and the like but also a desire of the user is respected.

The server 30 excludes, from the bus stop candidates, a place within a predetermined range from an entrance of a store. If a bus stop is set in the entrance of the store, it is likely that commercial transaction of the store is hindered and traffic of the other vehicles 50 and the like is hindered. According to the first embodiment, since a bus stop is set avoiding the entrance of the store, such a problem is prevented.

The server 30 determines a route passing the determined bus stop and outputs a command to the bus 40 to travel on the determined route. Therefore, according to the first embodiment, it is possible to cause the bus 40 to travel to pass the determined bus stop.

In the first embodiment, since a bus stop of the bus 40 is set based on the vehicle behavior information, even if the same desired boarding point is designated, the position of a bus stop during the last use and the position of a bus stop during the present use are sometimes different. In the first embodiment, the moving sign 10 is dispatched to the set bus stop. Therefore, it is possible to more clearly indicate the position of the bus stop to the user of the bus 40.

Other Embodiments

The embodiments described above are examples, and the present disclosure may be changed and carried out as appropriate without departing from the gist of the present disclosure.

The processes and means described in the present disclosure may be freely combined to the extent that no technical conflict exists.

Processing explained as being performed by one device may be shared and executed by a plurality of devices. Alternatively, processing explained as being performed by different devices may be executed by one device. In a computer system, it is possible to flexibly change by what kind of a hardware configuration (a server configuration) functions are implemented. For example, the moving sign 10 may include a part of the functions of the server 30.

In the first embodiment, the server 30 determines a bus stop. However, a place determined by the server 30 is not limited to the bus stop. For example, the server 30 can secure user safety as much as possible and may determine a place where traffic of the other vehicles 50 and the like is not hindered as much as possible as a alighting place of a vehicle used for ride share or a alighting place of a taxi.

In the first embodiment, the server 30 determines a bus stop of the on-demand bus 40 that transports a user according to a reservation of the user. However, the server 30 may determine a bus stop set anew in a fixed-route bus.

For example, in the first embodiment, a place where users are not safe and a place where traffic of the other vehicles 50 and the like is likely to be hindered are excluded from the bus stop candidates of the bus 40 based on the vehicle behavior information. However, the server 30 may further exclude, based on a video of the camera 60, from bus stop candidate places of the bus 40, a region in a predetermined range from an intersection. The vicinity of the intersection is a place where traffic accidents tend to occur and is a place where traffic jams tend to occur. Since the region in the predetermined range from the intersection is excluded from the bus stop candidate places, occurrence of traffic accidents in the intersection and occurrence of traffic jams in the intersection are prevented. Note that the server 30 can acquire the position of an intersection on a road by analyzing the video of the camera 60.

In the first embodiment, the camera 60 that monitors a road is used. However, a vehicle-mounted camera mounted on the bus 40 or the vehicle 50 may be used instead of the camera 60 or together with the camera 60. The server 30 may acquire a video from the vehicle-mounted camera mounted on the bus 40 or the vehicle 50 and acquire vehicle behavior information of the bus 40 or the vehicle 50 from the acquired video.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing device comprising
a processor configured to:
receive information indicating vehicle behavior about each of a plurality of vehicles from each of the plurality of vehicles, the information indicating the vehicle behavior including at least information indicating acceleration of each of the plurality of vehicles, the information indicating the acceleration being acquired from an acceleration sensor provided in each of the plurality of vehicles;
receive a use request from a user terminal of a user, the use request including at least a desired boarding point and a desired alighting point;
extract a first candidate boarding point and a first candidate alighting point from map information stored in a storage of the information processing device, the first candidate boarding point presenting within a first predetermined range from the desired boarding point, the first candidate alighting point presenting within the first predetermined range from the desired alighting point;
determine whether the first candidate boarding point and the first candidate alighting point are satisfied with a predetermined condition concerning the vehicle behavior, the predetermined condition including at least that a number of vehicles, the acceleration of which in absolute value is equal to or larger than a predetermined threshold, is equal to or less than a predetermined number of vehicles;
when the first candidate boarding point and the first candidate alighting point are not satisfied with the predetermined condition concerning the vehicle behavior, extract a second candidate boarding point and a second candidate alighting point from the map information to the exclusion of the first candidate boarding point and the first candidate alighting point, the second candidate boarding point presenting within the first predetermined range from the desired boarding point and being different from the first candidate boarding point, the second candidate alighting point presenting within the first predetermined range from the desired alighting point and being different from the first candidate alighting point;
determine whether the second candidate boarding point and the second candidate alighting point are satisfied with the predetermined condition concerning the vehicle behavior;
when the second candidate boarding point and the second candidate alighting point are satisfied with the predetermined condition concerning the vehicle behavior, determine the second candidate boarding point and the second candidate alighting point as a boarding and alighting point of a transport vehicle that transports the user and that is an autonomously travelable vehicle;
generate a first operation command for travelling, by the transport vehicle, to pass through the second candidate boarding point and the second candidate alighting point; and
transmit the first operation command to the transport vehicle to make the transport vehicle autonomously travel based on the first operation command.

2. The information processing device according to claim 1, wherein the predetermined condition includes that the information indicating the vehicle behavior indicates a place where user safety is easily secured.

3. The information processing device according to claim 1, wherein the predetermined condition further includes that the information indicating the vehicle behavior indicates a place where a traffic jam is less likely to occur.

4. The information processing device according to claim 1, wherein
the information indicating the vehicle behavior further includes information indicating a travelling direction of each of the plurality of vehicles, the information indicating the travelling direction being acquired from an azimuth sensor provided in each of the plurality of vehicles, and
the predetermined condition further includes that fluctuation in the travelling direction of the plurality of vehicles is within a predetermined range.

5. The information processing device according to claim 1, wherein
the information indicating the vehicle behavior further includes information indicating traveling speed of each of the plurality of vehicles, the information indicating the travelling speed being acquired from a speed sensor provided in each of the plurality of vehicles, and
the predetermined condition further includes that a number of vehicles, the traveling speed of which is equal to or smaller than a predetermined threshold, is equal to or less than a predetermined number of vehicles.

6. The information processing device according to claim 1, wherein the processor is further configured to:
receive, from a camera installed at a road, a video photographed by the camera, the video including the plurality of vehicles which travel on the road; and
acquire the information indicating the vehicle behavior about each of the plurality of vehicles based on the video including the plurality of vehicles.

7. The information processing device according to claim 1, wherein
a plurality of second candidate boarding points and a plurality of second candidate alighting points are extracted from the map information when the first candidate boarding point and the first candidate alighting point are not satisfied with the predetermined condition concerning the vehicle behavior,
when the plurality of second candidate boarding points and the plurality of second candidate alighting points are satisfied with the predetermined condition concerning the vehicle behavior, the processor further determines, as the boarding and alighting point, points closest to the desired boarding point and the desired alighting point received from the user terminal among the plurality of second candidate boarding points and the plurality of second candidate alighting points.

8. The information processing device according to claim 1, wherein, when the second candidate boarding point and the second candidate alighting point are satisfied with the predetermined condition concerning the vehicle behavior, the processor is further configured to:
determine, based on the map information, whether the second candidate boarding point and the second candidate alighting point present within a second predetermined range from an entrance of a store;
when the second candidate boarding point and the second candidate alighting point do not present within the second predetermined range from the entrance of the store, extract a third candidate boarding point and a third candidate alighting point from the map information to the exclusion of the second candidate boarding point and the second candidate alighting point, the third candidate boarding point presenting within the first predetermined range from the desired boarding point and being different from the first candidate boarding point and the second candidate boarding point, the third candidate alighting point presenting within the first predetermined range from the desired alighting point and being different from the first candidate alighting point and the second candidate alighting point;

determine whether the third candidate boarding point and the third candidate alighting point are satisfied with the predetermined condition concerning the vehicle behavior; and when the third candidate boarding point and the third candidate alighting point are satisfied with the predetermined condition concerning the vehicle behavior, determine the third candidate boarding point and the third candidate alighting point as the boarding and alighting point of the transport vehicle.

9. The information processing device according to claim 1, wherein:
the use request further includes a desired boarding date and time, and
the processor is further configured to:
when the second candidate boarding point and the second candidate alighting point are satisfied with the predetermined condition concerning the vehicle behavior:
generate the first operation command for travelling, by the transport vehicle, to pass through the second candidate boarding point at the desired boarding date and time and the second candidate alighting point; and
transmit the first operation command including the desired boarding date and time to the transport vehicle to make the transport vehicle autonomously travel based on the first operation command including the desired boarding date and time, and
generate a second operation command for at least moving, by a mobile display device that is an autonomously travelable vehicle, to the second candidate boarding point at a predetermined time before the desired boarding date and time and, at the second candidate boarding point, displaying, by the mobile display device, that the second candidate boarding point is the boarding and alighting point of the transport vehicle; and
transmit the second operation command to the mobile display device to make the mobile display device at least autonomously travel to the second candidate boarding point at the predetermined time before the desired boarding date and time and, at the second candidate boarding point, display that the second candidate boarding point is the boarding and alighting point of the transport vehicle based on the second operation command.

10. The information processing device according to claim 1, wherein, when the first candidate boarding point and the first candidate alighting point are satisfied with the predetermined condition concerning the vehicle behavior, the processor is configured to determine the first candidate boarding point and the first candidate alighting point as the boarding and alighting point of the transport vehicle.

11. An information processing method executed by a computer, comprising:
receiving information indicating vehicle behavior about each of a plurality of vehicles from each of the plurality of vehicles, the information indicating the vehicle behavior including at least information indicating acceleration of each of the plurality of vehicles, the information indicating the acceleration being acquired from an acceleration sensor provided in each of the plurality of vehicles;
receiving a use request from a user terminal of a user, the use request including at least a desired boarding point and a desired alighting point;
extracting a first candidate boarding point and a first candidate alighting point from map information stored in a storage of the computer, the first candidate boarding point presenting within a first predetermined range from the desired boarding point, the first candidate alighting point presenting within the first predetermined range from the desired alighting point;
determining whether the first candidate boarding point and the first candidate alighting point are satisfied with a predetermined condition concerning the vehicle behavior, the predetermined condition including at least that a number of vehicles, the acceleration of which in absolute value is equal to or larger than a predetermined threshold, is equal to or less than a predetermined number of vehicles;
when the first candidate boarding point and the first candidate alighting point are not satisfied with the predetermined condition concerning the vehicle behavior, extracting a second candidate boarding point and a second candidate alighting point from the map information to the exclusion of the first candidate boarding point and the first candidate alighting point, the second candidate boarding point presenting within the first predetermined range from the desired boarding point and being different from the first candidate boarding point, the second candidate alighting point presenting within the first predetermined range from the desired alighting point and being different from the first candidate alighting point;
determining whether the second candidate boarding point and the second candidate alighting point are satisfied with the predetermined condition concerning the vehicle behavior;
when the second candidate boarding point and the second candidate alighting point are satisfied with the predetermined condition concerning the vehicle behavior, determining the second candidate boarding point and the second candidate alighting point as a boarding and alighting point of a transport vehicle that transports the user and that is an autonomously travelable vehicle;
generating a first operation command for travelling, by the transport vehicle, to pass through the second candidate boarding point and the second candidate alighting point; and
transmitting the first operation command to the transport vehicle to make the transport vehicle autonomously travel based on the first operation command.

12. The information processing method according to claim 11, wherein the predetermined condition includes that the information indicating the vehicle behavior indicates a place where user safety is easily secured.

13. The information processing method according to claim 11, wherein the predetermined condition further includes that the information indicating the vehicle behavior indicates a place where a traffic jam is less likely to occur.

14. The information processing method according to claim 11, wherein
the information indicating the behavior of the plurality of vehicles further includes information indicating traveling speed of each of the plurality of vehicles, the information indicating travelling speed being acquired from a speed sensor provided in each of the plurality of vehicles, and
the predetermined condition further includes that a number of vehicles, the traveling speed of which is equal to or smaller than a predetermined threshold, is equal to or less than a predetermined number of vehicles.

15. The information processing method according to claim 11, wherein, when the second candidate boarding point and the second candidate alighting point are satisfied with the predetermined condition concerning the vehicle behavior, the computer further:
determines, based on the map information, whether the second candidate boarding point and the second candidate alighting point present within a second predetermined range from an entrance of a store;
when the second candidate boarding point and the second candidate alighting point do not present within the second predetermined range from the entrance of the store, extracts a third candidate boarding point and a third candidate alighting point from the map information to the exclusion of the second candidate boarding point and the second candidate alighting point, the third candidate boarding point presenting within the first predetermined range from the desired boarding point and being different from the first candidate boarding point and the second candidate boarding point, the third candidate alighting point presenting within the first predetermined range from the desired alighting point and being different from the first candidate alighting point and the second candidate alighting point;
determines whether the third candidate boarding point and the third candidate alighting point are satisfied with the predetermined condition concerning the vehicle behavior; and
when the third candidate boarding point and the third candidate alighting point are satisfied with the predetermined condition concerning the vehicle behavior, determines the third candidate boarding point and the third candidate alighting point as the boarding and alighting point of the transport vehicle.

16. The information processing method according to claim 11, wherein, when the first candidate boarding point and the first candidate alighting point are satisfied with the predetermined condition concerning the vehicle behavior, the computer determines the first candidate boarding point and the first candidate alighting point as the boarding and alighting point of the transport vehicle.

* * * * *